United States Patent
Kim et al.

(10) Patent No.: US 12,473,683 B2
(45) Date of Patent: Nov. 18, 2025

(54) CLOTHING TREATMENT APPARATUS

(71) Applicant: LG Electronics Inc., Seoul (KR)

(72) Inventors: Beomjun Kim, Seoul (KR); Injae Han, Seoul (KR); Sangwook Hong, Seoul (KR)

(73) Assignee: LG Electronics Inc., Seoul (KR)

( * ) Notice: Subject to any disclaimer, the term of this patent is extended or adjusted under 35 U.S.C. 154(b) by 383 days.

(21) Appl. No.: 17/916,190

(22) PCT Filed: Apr. 1, 2021

(86) PCT No.: PCT/KR2021/004067
§ 371 (c)(1),
(2) Date: Sep. 30, 2022

(87) PCT Pub. No.: WO2021/201629
PCT Pub. Date: Oct. 7, 2021

(65) Prior Publication Data
US 2023/0151528 A1    May 18, 2023

(30) Foreign Application Priority Data

Apr. 1, 2020  (KR) .................. 10-2020-0039765
Apr. 1, 2021  (KR) .................. 10-2021-0042707

(51) Int. Cl.
*D06F 37/04*     (2006.01)
*D06F 25/00*     (2006.01)
(Continued)

(52) U.S. Cl.
CPC .............. *D06F 37/04* (2013.01); *D06F 25/00* (2013.01); *D06F 33/43* (2020.02); *D06F 37/36* (2013.01);
(Continued)

(58) Field of Classification Search
CPC ...... D06F 37/04; D06F 37/36; D06F 2103/18; D06F 39/04; D06F 2105/46; D06F 33/43;
(Continued)

(56) References Cited

U.S. PATENT DOCUMENTS

2019/0249355 A1*  8/2019  Park .................. D06F 58/26
2019/0292711 A1*  9/2019  Im .................... D06F 37/04
2019/0323161 A1* 10/2019  Im .................... D06F 33/46

FOREIGN PATENT DOCUMENTS

KR    20060065939    6/2006
KR    20070057569    6/2007
(Continued)

*Primary Examiner* — Michael E Barr
*Assistant Examiner* — Lauren G Orta
(74) *Attorney, Agent, or Firm* — Fish & Richardson P.C.

(57) ABSTRACT

A clothing treatment includes: a cabinet; a door coupled to the cabinet; a tub; a drum provided inside the tub; a driving unit for rotating the drum; a gasket that connects an entrance of the cabinet to an opening of the tub; and a water supply unit for supplying water to the tub. The water supply unit is configured to supply water to the tub to a first water level higher than the lowest part of an inner side surface of the gasket. The driving unit is configured to rotate the drum at a first rotating speed at which a centrifugal force applied to laundry inside the drum is greater than the gravity applied to the laundry at the first water level.

12 Claims, 9 Drawing Sheets

(51) Int. Cl.

| | | |
|---|---|---|
| *D06F 33/43* | (2020.01) | |
| *D06F 37/36* | (2006.01) | |
| *D06F 39/04* | (2006.01) | |
| *D06F 39/08* | (2006.01) | |
| *D06F 58/26* | (2006.01) | |
| *D06F 58/45* | (2020.01) | |
| *H05B 6/10* | (2006.01) | |
| *D06F 103/18* | (2020.01) | |
| *D06F 105/46* | (2020.01) | |

(52) U.S. Cl.
CPC ............ *D06F 39/04* (2013.01); *D06F 39/087* (2013.01); *D06F 58/26* (2013.01); *D06F 58/45* (2020.02); *H05B 6/10* (2013.01); *D06F 2103/18* (2020.02); *D06F 2105/46* (2020.02)

(58) Field of Classification Search
CPC ........ D06F 39/087; D06F 25/00; D06F 58/45; D06F 58/26; H05B 6/10
See application file for complete search history.

(56) References Cited

FOREIGN PATENT DOCUMENTS

| | | |
|---|---|---|
| KR | 20090037860 | 4/2009 |
| KR | 20180101413 | 9/2018 |
| KR | 20200009831 | 1/2020 |

\* cited by examiner

[a]

[b]

[c]

[d]

CLOTHING TREATMENT APPARATUS

CROSS-REFERENCE TO RELATED APPLICATIONS

This application is a National Stage application under 35 U.S.C. § 371 of International Application No. PCT/KR2021/004067, filed on Apr. 1, 2021, which claims the benefit of Korean Patent Application No. 10-2020-0039765, filed on Apr. 1, 2020, and Korean Patent Application No. 10-2021-0042707, filed on Apr. 1, 2021. The disclosures of the prior applications are incorporated by reference in their entirety.

TECHNICAL FIELD

The present disclosure relates to a clothing treatment apparatus.

BACKGROUND ART

In general, a clothing treatment apparatus may include a washing machine, a dryer, and an apparatus for refreshing clothes. The washing machine may be a washing machine with a drying function.

The washing machine rotates a drum in a tub in which water is stored to remove contaminants from the laundry inside the drum. The washing machine may be provided with a heating unit for heating water and/or laundry or drying the laundry.

The dryer rotates a drum in a cabinet and applies heat to the laundry inside the drum to dry the laundry.

The clothing treatment apparatus may include a beating unit for heating or drying the laundry. The clothing treatment apparatus may include an electric heater or a heat pump as a heating unit.

In a related art, in a drying process, a hot air drying method of drying the laundry by heating the air circulating through a tub and an external circulation flow path has been used, and a method of heating the air by arranging a heating wire on an air circulation flow path has been used.

In order to use the hot air drying method described above, a gas heater or an electric heater capable of heating a heating wire is required, but the gas heater has problems with safety and exhaust gas, and the electric heater may have a problem of accumulated foreign substances such as scale and consume excessive energy.

In addition to the hot air drying method described above, there is a low temperature dehumidifying drying method using a heat pump. The heat pump uses a cooling cycle of an air-conditioner reversely, and therefore requires the same components such as an evaporator, condenser, expansion valve, and compressor.

Furthermore, another problem of the hot air drying method and the low temperature dehumidifying drying method is that, since these methods are indirect drying methods using air, a drying time may be lengthened if the laundry is clumped or contains a lot of moisture.

Meanwhile, recently, research on an induction module (or an induction heater) has been conducted as a new heating unit.

A coil is wound around an induction module provided in a clothing treatment apparatus such as a washing machine or a dryer, and heat may be transferred to a heating target (a drum of a washing machine) by an induced current generated by applying a current to the coil.

Since the induction module may heat the drum, in the case of a clothing treatment apparatus having the induction module, the laundry may be dried, even without a circulation duct guiding the air discharged from a tub applied to the hot air drying type clothing treatment apparatus back to the tub.

However, in the case of a clothing treatment apparatus not provided with a circulation duct, lint is accumulated on a rear surface of a cabinet door, the front of the tub, and the gasket during a drying cycle.

Patent Publication No. 10-2018-0023276 (published on Mar. 7, 2018) discloses a clothing treatment apparatus to which an induction unit is applied. However, the structure of the related art patent has a problem in that lint is accumulated on the back of the cabinet door, the front of the tub, and the gasket. Even if the drum is directly inductively heated through a magnetic field generated by the induction unit and the heated air is discharged to the outside of the tub, the problem of lint build accumulation mentioned above cannot be prevented because a flow of air introduced from the front of the tub is not formed.

DISCLOSURE

Technical Problem

The present disclosure aims to solve the above and other problems.

Another aspect of the present disclosure is to provide a clothing treatment apparatus, such as a dryer equipped with an induction heater, a washing machine, a washing machine combined dryer, or an apparatus for refreshing clothes.

Another aspect of the present disclosure is to provide a clothing treatment apparatus that performs drying without a duct for circulating air inside a drum.

Another aspect of the present disclosure is to provide a clothing treatment apparatus that reduces power consumption during drying.

Another aspect of the present disclosure is to provide a clothing treatment apparatus for removing lint accumulated in a door, a tub, a gasket, and the like.

Another aspect of the present disclosure is to provide a clothing treatment apparatus that removes lint accumulated in a door, a tub, a gasket, etc. using water in the tub.

Another aspect of the present disclosure is to provide a clothing treatment apparatus that removes lint accumulated during a drying process in a subsequent washing and/or rinsing process.

Technical Solution

According to an aspect of the present disclosure, a clothing treatment apparatus may include: a tub providing a space for receiving water, a drum rotatably provided in the tub, a driving unit rotating the drum, and a water supply unit that supplies water to the tub.

The clothing treatment apparatus may further include a cabinet having an inlet port and a door opening and closing the inlet port.

The cabinet may form the exterior of the clothing treatment apparatus. The cabinet may be provided with the inlet port on a front surface.

The door may be coupled to the cabinet. The door may be coupled to the front surface of the cabinet. The door may be rotatably coupled to the cabinet.

The tub may be disposed inside the cabinet. The tub may have an opening communicating with the inlet port of the cabinet. The tub may have an elongated cylindrical shape. The opening of the tub may be smaller than a diameter of the cylindrical shape of the tub.

The clothing treatment apparatus may include a gasket connecting the inlet port of the cabinet to the opening of the tub. The gasket may provide a laundry access passage. The gasket may have an inner surface, and the inner surface may provide the laundry access passage.

The drum may provide a space for accommodating laundry. The drum may have an elongated cylindrical shape. The drum may have a drum opening communicating with the opening of the tub.

The clothing treatment apparatus may include a driving unit that rotates the drum. The driving unit may be coupled to the tub. The driving unit may be coupled to a rear surface of the tub. A rotating shaft of the driving unit may be connected to the drum through the rear surface of the tub.

The clothing treatment apparatus includes a water supply unit supplying water to the tub. The water supply unit may be connected to an external water source to supply water to the tub. The water supply unit may include a water supply flow path connected to the external water source and a water supply valve opening and closing the water supply flow path.

The clothing treatment apparatus may further include an induction heater heating the drum. The induction heater may be disposed on an outer surface of the tub.

The induction heater may heat the drum in a state in which water in the tub is drained.

When the induction heater heats the drum, the driving unit may rotate the drum.

The induction heater may heat the drum, and the driving unit may rotate the drum to dry laundry in the drum. The laundry may be dried and lint may be separated from the laundry. The separated lint may accumulate in the gasket and the door.

Lint may accumulate on an inner surface of the gasket.

The door may have an inner surface located in the laundry access passage in a state in which the inlet port is closed. Lint separated from the laundry may be accumulated on the inner surface of the door.

The water supply unit may supply water to the tub up to a first water level. The first water level may be higher than the lowermost portion of the inner surface of the gasket. The first water level may be higher than a lower portion of the drum located vertically below a rotation center of the drum. The first water level may be located inside the drum.

The driving unit may rotate the drum at a first rotation speed in a state in which a water level of the tub is the first water level. The first rotation speed may be a rotation speed at which a centrifugal force acting on the laundry in the drum by the rotation of the drum is greater than gravity acting on the laundry. The first rotation speed may be 60 rpm or more. The first rotation speed may be 100 rpm.

When the drum rotates at the first rotation speed, the laundry in the drum may rotate integrally with the drum, without being separated from an inner circumferential surface of the drum, even at the highest point of the drum.

When the drum rotates at the first rotation speed, water in the tub may rise along the inner surface of the tub. When the drum rotates at the first rotation speed, water in the tub may rise along the inner surface of the tub to flow below the gasket. Water flowing below the gasket may remove lint accumulated below the gasket. Water flowing below the gasket may remove lint accumulated below the door.

The driving unit may accelerate the drum to rotate the drum at a first rotation speed. The driving unit may accelerate the drum when the water level of the tub is the first water level. The driving unit may accelerate the drum to the first rotation speed in a state in which the water level of the tub is the first water level.

The driving unit may accelerate the drum to the first rotation speed after passing a second rotation speed slower than the first rotation speed in a section in which the drum is accelerated to the first rotation speed. The second rotation speed may be a rotation speed at which the laundry in the drum rises above a height corresponding to a rotation center of the drum by the rotation of the drum and then falls apart from the drum.

The second rotation speed may be in the range of 40 rpm to 60 rpm. The second rotation speed may be 46 rpm.

The driving unit may rotate the drum, while maintaining the second rotation speed, in a state in which the water level of the tub is the first water level.

When the rotation speed of the drum passes the second rotation speed in the section in which the drum accelerates or when the drum rotates, while maintaining the second rotation speed, the laundry in the drum may rise to the height corresponding to the rotation center of the drum and then fall apart from the drum.

When the laundry falls, water in the drum may splash on the gasket and the door. Lint accumulated on the gasket and the door may be removed.

The clothing treatment apparatus may further include a water level detecting unit detecting a water level of the tub. The water supply unit may supply water to the tub based on the water level of the tub detected by the water level detecting unit.

The driving unit may stop the drum after rotating the drum at the first rotation speed.

When the drum rotates, the laundry in the drum may absorb water from the tub. As the laundry may absorb water in the tub, the water level of the tub may be lowered.

The water level detecting unit may detect the water level of the tub in a state in which the drum is stopped. The water level detecting unit may detect the water level of the tub after the drum rotates at the first rotation speed and stops.

The water supply unit may re-supply water to the tub up to the first water level when the water level of the tub is lower than the first water level after the drum rotates at the first rotation speed. When the water level of the tub is lower than the first water level in a state in which the drum stops, the water supply unit may re-supply water to the tub. The water supply unit may re-supply water to the tub up to the first water level.

The driving unit may rotate the drum again at the first rotation speed after the water supply unit re-supplies water to the tub.

If the drum rotates after the resupplying of water, the laundry may not absorb more water. When the drum rotates at the first rotation speed after the resupplying of water, the water level of the tub may not decrease.

The water level of the tub in a section in which the drum rotates at the first rotation speed after the resupplying of water may be higher than the water level in the tub in a section in which the drum rotates at the first rotation speed before the resupplying of water.

When the drum rotates at the first rotation speed after the resupplying of water, water in the tub may flow on the inner surface of the gasket, and water flowing on the inner surface of the gasket may reach a position higher than that when the drum rotates before the resupplying of water. Water flowing on the inner surface of the gasket may remove lint accumulated at a position higher than a position of lint removed before the resupplying of water. The water flowing on the inner surface of the gasket may remove lint accumulated in the door.

The driving unit may brake the drum after rotating the drum at the first rotation speed. The driving unit may brake the drum by reverse-phase braking.

A phase of power applied to the driving unit in a section in which the drum is braked may be reversed from a phase of power applied to the driving unit in a section in which the drum rotates at the first rotation speed.

The driving unit, before rotating the drum at the first rotation speed, may accelerate the drum to the first rotation speed, and a magnitude of acceleration in a section in which the drum brakes may be greater than a magnitude of acceleration in a section in which the drum is accelerated up to the first rotation speed.

The driving unit, in a state in which the water level in the tub is the first water level, may rotate the drum by a rotation angle within the range of 90 degrees to 180 degrees at the first rotation speed and then brakes the drum, and rotation and braking of the drum may be repeated alternately.

When the drum is braked, the laundry in the drum may be separated from the drum and fall. As the laundry falls, water in the drum may splash on the gasket and the door. Lint accumulated on the gasket and the door may be removed by the water splashed as the laundry falls. Lint accumulated at a higher position than that of lint removed by the dropped laundry according to rotation of the drum at the second rotation speed may be removed.

The clothing treatment apparatus may further include a circulation pump pumping water discharged from the tub, a nozzle provided in the gasket and having an outlet located in the laundry access passage, and a circulation flow path connecting the circulation pump to the nozzle.

The circulation pump may be driven when the driving unit rotates the drum.

When the circulation pump is driven, the circulation nozzle may spray water. The circulation nozzle may spray water to an inner surface of the gasket. The circulation nozzle may spray water to an inner surface of the door. The water sprayed from the circulation nozzle may remove lint accumulated on the gasket and the door.

The clothing treatment apparatus may further include a controller controlling the driving unit and the water supply unit. The controller may control rotation of the driving unit. The controller may control a rotation speed and a rotation direction of the driving unit.

The controller may control the water supply unit based on a water level of the tub detected by the water level detecting unit.

The water supply unit may include a water supply flow path connecting the water source to the tub and a water supply valve opening and closing the water supply flow path.

The controller may control the water supply valve. The controller may control the water supply valve based on the water level of the tub detected by the water level detecting unit.

The controller may control the circulation pump. The controller may drive the circulation pump when the driving unit is driven.

The controller may control the induction heater.

Various embodiments of the present disclosure provides a clothing treatment apparatus and a control method thereof, capable of washing an inner surface of a door and an inner circumferential surface of a gasket by transferring wash water to the front of a tub by maximizing a water splash effect of wash water accommodated in the tub by controlling a motion of a drum, water supply of wash water, and supply of circulating water in a rinsing section during a washing cycle.

An embodiment of the present disclosure provides a clothing treatment apparatus and a control method thereof, capable of washing an inner surface of a door and an inner circumferential surface of a gasket by transferring wash water to the inner surface of the door and the inner circumferential surface of the gasket by generating a water current through which wash water supplied to a tub flows by rotating a drum after wash water is supplied to a water level at which a lower portion of the gasket is submerged in a rinsing section.

An embodiment of the present disclosure provides a control method of a clothing treatment apparatus including a cabinet having an inlet port formed therein, a door opening and closing the inlet port, a tub provided inside the cabinet to accommodate water, a drum rotatably provided in the tub to receive laundry, a driving unit coupled to the tub to rotate the drum, a gasket connecting the inlet port to an opening of the tub, a water supply unit communicating with the gasket and supplying water to the tub through the gasket, and a circulation unit connecting the gasket to the tub to supply water discharged from the tub to the gasket, including: a first water supply step of supplying water to the tub: a rotating step of rotating the drum at a first RPM after the first water supply step: a second water supply step of supplying water to the tub to a second water level higher than the first water level through the water supply unit after the rotating step: an acceleration step of accelerating the drum to a second RPM: a lint removal step of removing lint accumulated on an inner circumferential surface of the gasket and an inner surface of the door by forming a water current according to a rotation of the drum with water supplied to the second water level by maintaining rotation of the drum to the second RPM after the acceleration step; and a deceleration step of decelerating rotation of the drum after the lint removal step.

The acceleration step, the lint removal step, and the deceleration step may be performed while the second water supply step is performed, and the acceleration step may be performed when the water level in the tub reaches the second water level.

The method may further include a circulating water supply step of supplying water discharged from the tub to the gasket through the circulation unit to remove lint accumulated on the inner circumferential surface of the gasket and the inner surface of the door, wherein the circulating water supply step may be performed while accelerating the drum to a second RPM, and may be terminated while decelerating the rotation of the drum.

The acceleration step, the lint removal step, the deceleration step, and the circulating water supply step may be performed at least once during a rinsing cycle of the clothing treatment apparatus.

The second RPM may be equal to the first RPM, or the second RPM may be greater than the first RPM.

An embodiment of the present disclosure provides a clothing treatment apparatus including: a cabinet forming an exterior and including an inlet port, a door opening and closing the inlet port, a tub provided inside the cabinet and forming an opening communicating with the inlet port, a drum rotatably installed inside the tub to accommodate laundry, a gasket connecting the inlet port of the cabinet to the opening of the tub, an induction module provided in the tub and heating a circumferential surface of the drum through a magnetic field generated by applying a current, a driving unit coupled to the tub to rotate the drum, a water supply unit communicating with the gasket to supply water to the tub through the gasket, and a controller controlling the driving unit and the water supply unit, wherein the controller controls the water supply unit and the driving unit such that water is supplied to the tub to a first water level for rinsing the laundry through the water supply unit, the drum is rotated at a first RPM, and thereafter, the drum is rotated at a second RPM while water is supplied to a second water level higher than the first water level through the water supply unit, so that water supplied to the second water level forms a water current according to the rotation of the drum to remove lint accumulated on an inner circumferential surface of the gasket and an inner surface of the door.

The clothing treatment apparatus may further include a circulation unit forming a flow path for circulating water discharged from the tub, wherein the circulation unit may include a circulation flow path connecting the tub to the gasket and a circulation pump providing power to the circulation flow path.

The controller may control the circulation pump to supply water discharged from the tub to an inner circumferential surface of the gasket, and the controller may control the circulation pump to be operated, while accelerating the drum at the second RPM, so that water discharged from the tub is supplied to the inner circumferential surface of the gasket.

Also, the controller may stop the operation of the circulation pump when the rotation of the drum is decelerated from the second RPM.

The second RPM may be equal to the first RPM, or the second RPM may be set to be greater than the first RPM.

In an embodiment of the present disclosure, a water supply flow path may be formed through the gasket. In addition, a circulating water supply flow path may be formed through the tub, the circulation pump, and the gasket.

In an embodiment of the present disclosure, water may be supplied to the first water level that is a rinsing water level through the water supply unit and the motor may be controlled to rotate at a first rotation speed of 1G or more at which the laundry adheres to an inner wall of the drum by centrifugal force to rotate, and the circulation pump may be controlled to be driven to supply of wash water in the tub to the inside of the drum.

In an embodiment of the present disclosure, water may be supplied to a water level above the rinsing water level, the motor may be controlled to rotate the drum at a second rotation speed greater than the first rotation speed, and the circulation pump may be controlled to be driven to supply wash water in the tub to the inside of the drum.

In an embodiment of the present disclosure, a water supply port may be formed in the gasket so that water may be supplied through the gasket, and at least one water supply port may be formed on the gasket and may be provided above the gasket.

In an embodiment of the present disclosure, when the drum is rotated reversely in both directions, the drum may be rotated by more than 1G so that the laundry is moved in both directions along the inner wall of the drum, reverse braking may be performed to drop the laundry when the laundry is located at the top of the drum, and then, the drum may be controlled to rotate in the opposite direction again.

Each of the features of the embodiments described above may be implemented in combination in other embodiments as long as they are not contradictory or exclusive to other embodiments.

Advantageous Effects

According to at least one of the embodiments of the present disclosure, lint accumulated in the gasket and the door may be removed.

In addition, lint accumulated in the gasket and the door may be removed without a duct for discharging air toward the gasket and the door.

In addition, since lint may be removed without a duct, the laundry may be dried by heating the drum, instead of a hot air drying method.

In addition, since a duct may not be provided, it is possible to increase the degree of freedom in an installation position of an induction module.

In addition, power consumption during drying may be reduced by providing an induction module.

In addition, lint accumulated on the gasket and the door may be removed during a washing cycle and a rinsing cycle.

In addition, lint generated during a drying cycle of the clothing treatment device to which an induction module (IH module) is applied and accumulated in the inner surface of the door, the inner circumferential surface of the gasket, and the front of the tub may be removed by forming a water current of wash water supplied to the inside of the tub during a washing cycle.

Also, lint accumulated in a lower portion of the gasket and a lower portion of the inner surface of the door may be removed by forming a water current after water is supplied so that a portion of the inner circumferential surface of the gasket is submerged.

In addition, lint accumulated on a central portion and an upper portion of the gasket and a central portion and upper portion of the inner surface of the door may be removed by causing a phenomenon that water is splashed to the front of the tub by controlling a motion of the drum at a set water level at which a portion of the inner circumferential surface of the gasket is submerged after wash water is supplied to the set water level.

In addition, by supplying water and circulating water to the front of the tub, lint accumulated on an upper portion of the inner surface of the door may be removed.

The effects of the present disclosure are not limited to those described above, and other effects not mentioned will be clearly recognized by those skilled in the art from the following description.

MODE FOR DISCLOSURE

Figure 1:
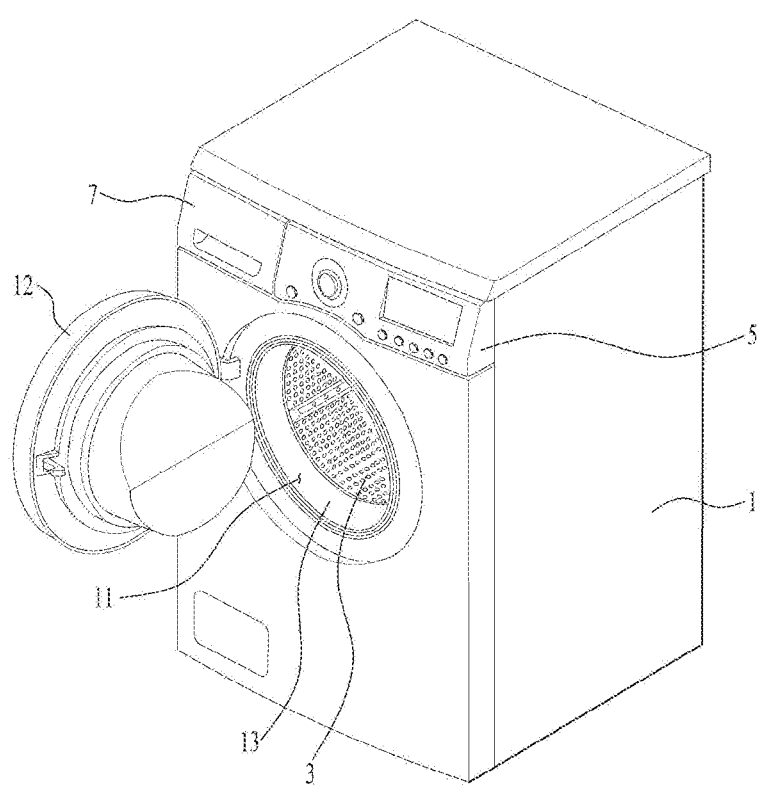
FIG. 1 is a view illustrating an exterior of a clothing treatment apparatus according to an embodiment of the present disclosure.

Hereinafter, the embodiments of the present disclosure will be described in detail with reference to the accompanying drawings. The same or corresponding elements will be consistently denoted by the same respective reference numerals and described in detail no more than once regardless of drawing symbols.

In addition, terms "module" and "unit" for components used in the present specification are used only in order to easily make the specification. Therefore, these terms do not have meanings or roles that are distinguished from each other In the following description, when the detailed description of the relevant known function or configuration is determined to unnecessarily obscure the important point of the present disclosure, the detailed description will be omitted. The accompanying drawings of the present disclosure aim to facilitate understanding of the present disclosure and should not be construed as limited to the accompanying drawings. Also, the present disclosure is not limited to a specific disclosed form, but includes all modifications, equivalents, and substitutions without departing from the scope and spirit of the present disclosure.

It will be understood that, although the terms first, second, etc. May be used herein to describe various elements, these elements should not be limited by these terms. These terms are only used to distinguish one element from another.

When it is mentioned that a certain element is "connected to" or "electrically connected to" a second element, the first element may be directly connected or electrically connected to the second element, but it should be understood that a third element may intervene therebetween. Meanwhile, when it is mentioned that a certain element is "directly connected to" or "directly electrically connected to" a second element, it should be understood that there is no third element therebetween.

As used herein, the singular forms "a", "an" and "the" are intended to include the plural forms as well, unless the context clearly indicates otherwise.

Furthermore, although each drawing is described for convenience of description, it is also within the scope of the present disclosure that those skilled in the art implement other embodiments by combining at least two or more drawings.

Figure 2:
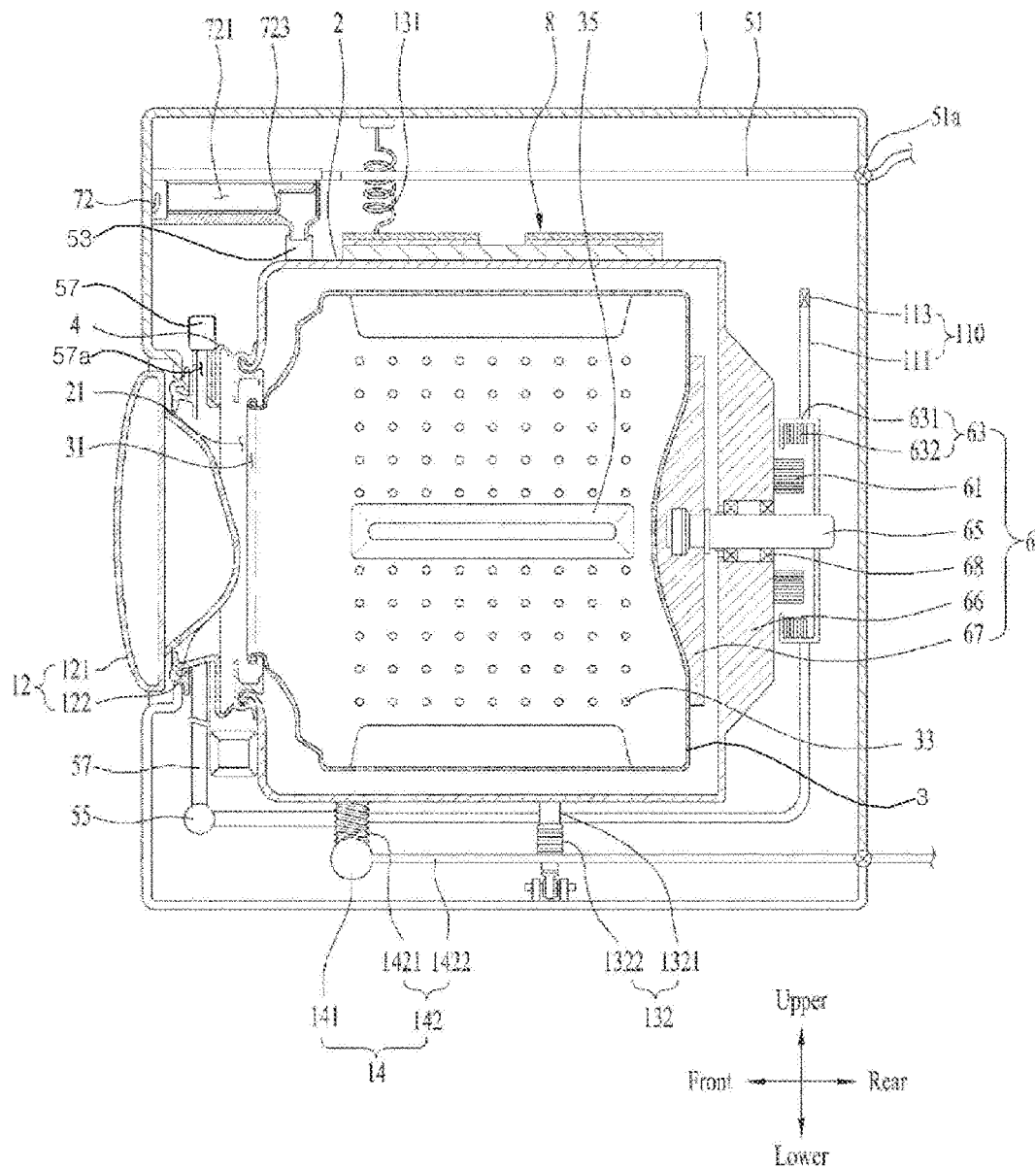
FIG. 2 is a view illustrating an internal configuration of the clothing treatment apparatus of FIG. 1.

FIG. 1 is a view illustrating an exterior of a clothing treatment apparatus according to an embodiment of the present disclosure, and FIG. 2 is a view illustrating an internal configuration of the clothing treatment apparatus of FIG. 1.

To help understanding of a detailed structure of the clothing treatment apparatus according to an embodiment of the present disclosure, a direction toward a door 12 with respect to the center of the clothing treatment apparatus may be defined as a front.

In addition, a direction opposite to the direction toward the door 12 may be defined as a rear direction, and right and left directions may be defined depending on the front and rear directions defined above.

Hereinafter, descriptions are given with reference to FIGS. 1 and 2.

The clothing treatment apparatus according to an embodiment of the present disclosure may be a washing machine, a dryer, a washing machine combined with drying, or an apparatus for refreshing clothes.

The clothing treatment apparatus may be a dryer that does not include a tub 2. Alternatively, the clothing treatment apparatus may be a washing machine combined with drying including a tub 2. Hereinafter, as a clothing treatment apparatus of the present disclosure, a washing machine combined with drying will be described as a representative example. However, the clothing treatment apparatus of the present disclosure is not limited thereto.

A clothing treatment apparatus according to an embodiment of the present disclosure may include a cabinet 1 forming an exterior, the tub 2 provided inside the cabinet 1, and a drum 3 rotatably provided inside the tub 2 and accommodating an object (for example, a laundry object, a drying object, or a refresh object).

For example, clothes that are washed with wash water may be called a laundry object, wet clothes that are dried using heat may be called a drying target, and dry clothes that are refreshed using hot air, cold air, or steam may be called a refresh object. Accordingly, clothes may be washed, dried, or refreshed through the drum 3 of the clothing treatment apparatus.

The cabinet 1 may include an inlet port provided at the front of the cabinet 1 through which an object enters and exits, and the cabinet 1 may have a door 12 rotatably connected to the cabinet 1 to open and close the inlet port.

The door 12 may include a door frame 121 and a transparent window 122 provided in a central portion of the door frame 121.

A control panel 5 may be provided on an upper front side of the clothing treatment apparatus. The control panel 5 may be provided for a user interface. Various user inputs may be performed through the control panel 5, and input information or various information of the clothing treatment apparatus may be displayed. Accordingly, the control panel 5 may include an operating unit for a user to operate the clothing treatment apparatus and a display for displaying information to the user.

Meanwhile, the tub 2 forms a space in which water may be stored. The tub 2 may extend in a cylindrical shape. The tub 2 may have a longitudinal axis parallel to a lower surface of the cabinet 1 or may form a predetermined angle with the cabinet 1. An extension line of a longitudinal axis of the tub 2 may pass through a rear surface of the cabinet 1. The tub 2 has an opening 21 communicating with the inlet port. A tub opening 21 is provided at the front. The tub 2 may include the tub opening 21 and the tub body 22 constituting the body of the tub. Accordingly, the tub body 22 may be provided in a cylindrical shape, and the tub opening 21 may be provided to correspond to a shape of the tub body 22.

The tub 2 may be fixed to a lower surface (bottom surface) of the cabinet 1 by a second support portion 132, and the second support portion 132 may include a support bar 1321 and a damper 1322 to damp a vibration generated in the tub 2 by the rotation of the drum 3.

In addition, the first support portion 131 fixed to the upper surface of the cabinet 1 may be connected to the upper surface of the tub 2. Vibration generated in the tub 2 and transmitted to the cabinet 1 may be damped through the first support portion 131.

That is, through the first support portion 131 and the second support portion 132, the tub 2 may be supported inside the cabinet 1 and vibration generated from the tub 2 may be damped.

The drum 3 may include a body extending in a cylindrical shape. The drum 3 may be formed of a conductor. A body of the drum 3 may be formed of a conductor. The body of the drum 3 may be formed of metal. A plurality of through-holes 33 may be formed in the drum 3.

The drum 3 may provide a space for storing objects (laundry, drying objects, and refresh objects). The drum 3 may extend in a cylindrical shape. The drum 3 may have a longitudinal axis parallel to a lower surface (bottom surface) of the cabinet 1 or may form a predetermined angle. An extension line of the longitudinal axis of the drum 3 may pass through the rear surface of the cabinet 1. A drum opening 31 communicating with the tub opening 21 may be provided at the front of the drum 3. An angle between the central axis of the drum 3 and the tub 2 with respect to the bottom surface may be the same.

A plurality of through-holes 33 passing through the drum 3 may be formed on an outer circumferential surface of the drum 3. Through the through-hole 33, air and wash water may be introduced between the inside of the drum 3 and the inside of the tub 2.

A lifter 35 for stirring an object when the drum 3 rotates may be provided on an inner circumferential surface of the drum 3. The lifters 35 may extend along the longitudinal direction of the drum 3 from the inner circumferential surface of the drum 3 and may be provided in plurality on the inner circumferential surface of the drum 3.

The drum 3 may be rotated by a driving unit 6 provided at the rear of the tub 2.

The driving unit 6 may include a stator 61 fixed to the rear surface of the tub 2, a rotor 63 rotating by an electromagnetic action with the stator, and a rotating shaft 65 connecting the drum 3 and the rotor 63 through the rear surface of the tub 2.

The stator 61 may be fixed to the rear surface of the bearing housing 66 provided on the rear surface of the tub 2, and the rotor 63 may include a rotor magnet 632 provided on a radially outer side of the stator 61 and a rotor housing 631 connecting the rotor magnet 632 to the rotating shaft 65.

A plurality of bearings 68 supporting the rotating shaft 65 may be provided inside the bearing housing 66.

In addition, a spider 67 that easily transmits a rotational force of the rotor 63 to the drum 3 may be provided on the rear surface of the drum 3, and the rotating shaft 65 for transmitting rotational power of the rotor 63 may be fixed to the spider 65.

Meanwhile, a detergent box 7 may be provided on the upper front side of the clothing treatment apparatus. A detergent, fabric softener, etc. may be supplied through the detergent box 7. The detergent box 7 may be provided with a handle so that the user may slide the detergent box 7 toward the front of the cabinet 1 to open and close the detergent box 7.

More specifically, the detergent box 7 may be provided to include a case 71 provided inside the cabinet 1 and a drawer 72 withdrawable from the case 71.

The drawer 72 accommodated in the case 71 may be drawn out of the cabinet 1 through a drawer outlet provided to pass through the front surface of the cabinet 1. The drawer 72 may be provided as a polyhedron (e.g., a hexahedron) with an open upper surface, and a storage unit 721 providing a space for storing a detergent and a detergent outlet 723 connecting the storage unit 721 to the case 71 may be provided inside the drawer 72. The detergent outlet 723 may be provided as a through-hole penetrating a rear surface or a bottom surface of the storage unit 721, and may be provided as a bell trap provided on a bottom surface of the storage unit 721.

The water supply units 51 and 53 may be connected to a water source to supply water to the tub 2. The water source may be a water source outside the cabinet, such as a water supply. The water supply units 51 and 53 may include a water supply flow path 51 supplying water from the water source to the storage unit 721 and a water supply valve that opens or closes the water supply flow path 51 according to a control signal from the controller 10. Water supply units 51 and 53

Therefore, when water is supplied to the storage unit 721 in which the detergent is stored through the water supply flow path 51, the detergent in the storage unit 721 moves to the case 71 through the detergent outlet 723 together with water. A liquid in which the detergent and water are mixed may be referred to as detergent water.

Meanwhile, a detergent may not be accommodated in the storage unit 721. In this case, the water supplied to the storage unit 721 may move to the case 71 through the outlet 723.

The water supply units 51 and 53 may include a supply pipe 53 connecting the detergent box 7 to the tub 2. The supply pipe 53 may be connected to the case 71. The supply pipe 53 may be connected to an upper portion of the tub 2.

The detergent water or water of the case 71 may be supplied to the tub 2 through the supply pipe 53.

The water supplied to the tub 2 is discharged to the outside of the cabinet 1 through a drain unit 14. The drain unit 6 may include a drain pipe 142 that forms a drain passage through which water inside the tub 2 moves and a drain pump 141 that generates a pressure difference in the drain pipe 142 so that water supplied into the tub is drained to the outside of the cabinet 1 through the drain pipe 142.

In more detail, the drain pipe 142 may include a first drain pipe 1421 connecting a lower surface of the tub 2 to the drain pump 141 and a second drain pipe 1422 having one end connected to the drain pump 141 to form a flow path through which water moves to the outside of the cabinet 1.

Furthermore, the clothing treatment apparatus according to an embodiment of the present disclosure further includes a water level detecting unit 110 detecting a water level inside the tub body 22. The water level detecting unit 110 may include a communication pipe 111 having the same water level as the water level inside the tub body 21 and a sensor 113 detecting a change in pressure inside the communication pipe 111.

One end of the communication pipe 111 is connected to the first drain pipe 1421, and the other end is provided to be located at a point higher than a rotation center of the drum 3. Accordingly, when all the water inside the tub body 22 has moved to the first drain pipe 1421, the water level detecting unit 110 may also detect the water level in the first drain pipe 1421.

The clothing treatment apparatus according to an embodiment of the present disclosure may include a gasket 4. The gasket 4 may connect the inlet port 11 of the cabinet 1 to the tub opening 21. The gasket 4 may form a passage for loading and unloading laundry.

The gasket 4 may have an elongated tubular shape. One end of the gasket 4 may be coupled to the tub opening 21. The other end of the gasket 4 may be coupled to the inlet port 11 of the cabinet 1. The gasket 4 may extend from the tub opening 21 to the inlet port 11 of the cabinet 1.

The gasket 4 may prevent vibration of the tub 2 from being transmitted to the cabinet 1. The gasket 4 may be formed of a flexible material. For example, the gasket 4 may be formed of a material such as rubber, ethylene propylene diene monomer (EPDM), or thermo plastic elastomer (TPE). However, the present disclosure is not limited thereto.

The gasket 4 may seal between the cabinet 1 and the tub 2. That is, the gasket 4 may prevent water inside the tub 2 from leaking into the space between the tub 2 and the cabinet 1.

Meanwhile, the clothing treatment apparatus according to an embodiment of the present disclosure may include circulation units 55 and 57 for recirculating the water drained from the tub 2. The circulation units 55 and 57 include a circulation pump 55 pumping water discharged from the tub 2, a nozzle 57a spraying the pumped water into the tub 2 or drum 3, and a circulation flow path 57 connecting the circulation pump 55 and the nozzle 57a.

The circulation pump 55 may communicate with the inside of the tub 2 through a bottom surface of the tub 2. A flow path connecting the circulation pump 55 and the tub 2 may be connected to an inlet of the circulation pump 55. The circulation pump 55 may be connected to the first drain pipe 1421 described above. Alternatively, the circulation pump 55 may be connected to the bottom surface of the tub 2 through a separate flow path from the first drain pipe 1421.

The circulation pump 55 may be provided separately from the aforementioned drain pump 141. Alternatively, the circulation pump 55 and the drain pump 141 may be provided in one housing. Alternatively, a single pump may serve as a circulation pump and a drain pump.

The circulation flow path 57 may connect the circulation pump 55 and the nozzle 57a.

The circulation flow path 57 may be connected to the circulation pump 55. The circulation flow path 57 may be connected to an outlet of the circulation pump 55.

The circulation flow path 57 may be connected to the nozzle 57a. The circulation flow path 57 may communicate with the nozzle 57a. The circulation flow path 57 may be connected to the gasket 4. The circulation flow path 57 may be connected to the nozzle 57a provided in the gasket 4.

The circulation flow path 57 may guide the water pumped by the circulation pump 55 to the nozzle 57a. The circulation flow path 57 may supply water pumped by the circulation pump 55 to the nozzle 57a.

The nozzle 57a may be provided in the gasket 4. The nozzle 57a may be integrally formed with the gasket 4, or may be manufactured separately from the gasket 4 and coupled to the gasket 4.

The nozzle 57a may pass through the gasket 4. An outlet of the nozzle 57a may be located inside the gasket 4. An inlet of the nozzle 57a may be located outside the gasket 4. The nozzle 57a may be connected to the circulation flow path 57 from the outside of the gasket 4.

The nozzle 57a may communicate with a space surrounded by the inner circumferential surface of the gasket 4. That is, the nozzle 57a may communicate with the laundry access passage described above. The nozzle 57a may communicate with the internal space of the tub 2 and the internal space of the drum 3 through the laundry access passage.

The nozzle 57a may spray water pumped by the circulation pump SS and introduced along the circulation flow path 57a. The nozzle 57a may spray water to the inner surface of the gasket 4. The nozzle 57a may spray water on the inner surface 122 of the door 12. The nozzle 57a may spray water into the drum 3.

The nozzle 57a may be located above the center of the gasket 4.

A plurality of nozzles 57a may be provided. The plurality of nozzles may be arranged along the circumferential direction of the gasket 4. The plurality of nozzles may include a nozzle 57a located above the center of the gasket 4. The plurality of nozzles may include a nozzle located below the center of the gasket 4.

Meanwhile, the clothing treatment apparatus according to an embodiment of the present disclosure may further include a direct water nozzle connected to an external water source in addition to the nozzle 57a connected to the circulation pump 55. The water supply units 51 and 53 may further include a separate nozzle water supply flow path in addition to the water supply flow path 51, and the nozzle water supply flow path may be connected to the external water source and be controlled by a valve. In addition, a direct water nozzle connected to the nozzle water supply flow path may be further provided in the gasket 4.

As water supplied through the nozzle 57a or the direct water nozzle flows along the inner surface of the door 12, lint adhered to the inner surface of the door 12 may be removed. In addition, water supplied through the nozzle 57a may flow along the inner circumferential surface of the gasket 4, and lint accumulated on the inner circumferential surface of the gasket 4 may be removed.

In addition, lint adhered to the gasket 4 and the inner surface 122 of the door may be removed by supplying water to the tub 2, the gasket 4, and the inner surface 122 of the door through RPM control of the drum 3, which will be described later.

The clothing treatment apparatus according to an embodiment of the present disclosure may include an induction module 8 for heating the drum 3. The induction module 8 includes a coil. When power is applied to the induction module 8, a magnetic field is generated by the coil. The induction module 8 may heat the drum 3 through the generated magnetic field.

The induction module 8 may beat the drum 3 to heat wash water in the tub 2 and laundry in the drum 3. The clothing treatment apparatus of the present disclosure may improve washing performance by increasing the temperature of wash water and laundry.

Also, the induction module 8 may dry the laundry by heating the drum 3.

Figure 3:
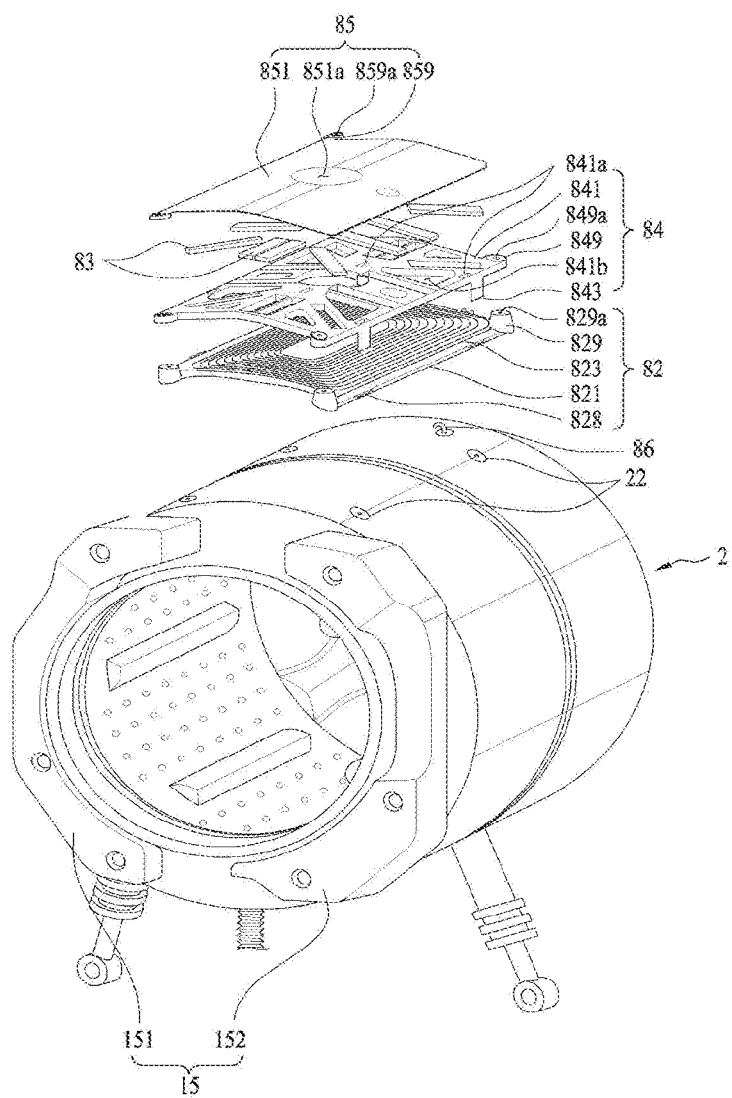
FIG. 3 is a view illustrating an induction module, a tub, and a drum.

FIG. 3 is a view illustrating an induction module, a tub, and a drum.

Hereinafter, the induction module 8 and a structure for mounting the induction module 8 in the clothing treatment apparatus will be described with reference to FIG. 3.

The induction module 8 is mounted on a circumferential surface of the tub 2 to heat the circumferential surface of the drum 3 through a magnetic field generated when a current is applied to a coil a round which a wire is wound.

More specifically, when an alternating current (AC) in which a phase of a current is changed flows through the coil, the coil forms a radial alternating magnetic field according to the Ampere circuit law. Thereafter, when the alternating magnetic field is concentrated toward the drum 3 formed of a conductor having high magnetic permeability, an eddy current is formed in the drum 3 according to Faraday's law of induction.

Accordingly, the eddy current flowing through the drum 3 is converted into Joule heat by resistance of the drum 3 itself, so that the inner circumferential surface of the drum 3 is directly heated.

In order to fix the coil to the upper surface of the tub 2, the clothing treatment apparatus according to an embodiment of the present disclosure may further include a base housing 82. The base housing 82 may be fixed to the circumferential surface of the tub 2, may pass through the rotating shaft 65, and may be provided above a horizontal surface parallel to the ground.

More specifically, the base housing 82 may be provided in a rectangular plate shape or a rectangular shape having a predetermined thickness, may have a front-rear length thereof shorter than a front-rear length of the tub 2, and may include a base body 821 located above the drum 3.

The base body 821 may be formed to have the same curvature as that of the outer circumferential surface of the tub 2 or the drum 3 in order to concentrate the magnetic field generated from the coil to the drum 3.

In addition, the base housing 82 may further include a fixing rib 823 protruding upward from the upper surface of the base body 821 to allow a coil to be wound therearound, and the fixing rib 823 forms a coil slot into which a wire forming a coil is inserted. That is, the coil in the coil slot may be fixed to the base housing 82 by an interference fit method.

The induction module 8 may further include a permanent magnet 83 provided above the base housing 82 and serving as a bar magnet in order to concentrate the magnetic field generated in the coil toward the drum 3.

A plurality of the permanent magnets 83 may be provided so as to be spaced apart from each other in a longitudinal direction of the coil, located above the coil fixed to the base housing 82, and disposed perpendicular to a longitudinal direction of the wire forming the coil. This is to cover both the inner coil and the outer coil at the same time.

In order to fix the permanent magnet 83 to the base housing 82, the induction module 8 may further include a permanent magnet housing 84 coupled to an upper side of the base housing 82.

The permanent magnet housing 84 may include a permanent magnet housing body 841 having a shape corresponding to the base body 821 in a rectangular plate shape or a rectangle having a predetermined thickness, a plurality of permanent magnet mounting portions 842 provided in the permanent magnet housing body 841, and an air flow hole 841b provided to pass through the permanent magnet housing body 841 and located between the plurality of permanent magnet mounting portions 842.

The permanent magnet mounting portion 842 is provided so that the permanent magnet 83 is inserted from the upper side to the lower side, and may be formed to support a lower portion of the permanent magnet 83. Therefore, in order to prevent the permanent magnet 83 from being separated upward from the permanent magnet mounting portion 842, the induction module 8 of the present disclosure may further include a cover 85 coupled to the permanent magnet housing 84.

The cover 85 may include a cover body 851 having a rectangular plate shape or a rectangular shape having a predetermined thickness and an air discharge hole 851a provided at the center of the cover body 851 to discharge hot air (air) by convection.

The reason for separating the permanent magnet housing 84 and the cover 85 is to allow air to flow over the upper surface of the permanent magnet 83 to accelerate cooling of the permanent magnet 83, allow the permanent magnet 83 to be easily inserted and detached so as to be exchanged, and a component for fixing the permanent magnet 83 not to have a closed surface to facilitate injection.

Hereinafter, a structure for fixing the base housing 82, the permanent magnet housing 84, and the cover 85 to the tub 2 will be described. As described above, the induction module 8 of the present disclosure is a configuration for inductively heating the drum 3 and should be provided to be spaced apart from the outer circumferential surface of the drum 3 by a predetermined distance. Therefore, the induction module 8 of the present embodiment may be fixed to the tub 2.

First, the base housing 82 may include a first fastening portion 829 provided at a corner of the base body 821 and having a first fastening hole 829a into which a screw is inserted. The first fastening portion 829 may be provided to protrude from both sides of a front end and a rear end of the base body 821.

A plurality of housing fixing portions 22 having a hollow communicating with the first fastening hole 829a may be provided in the tub 2.

In addition, the permanent magnet housing 84 may also be provided at the edge of the permanent magnet housing body 841 and may have a third fastening portion 849 having a second fastening hole 849a into which a screw is inserted in communication with the first fastening hole 829a. The third fastening portion 849 may be provided to protrude from both sides of the front end and the rear end of the permanent magnet housing body 841.

In addition, the cover 85 may have a third fastening portion 859 protruding from the front and rear ends of the cover body 851 and having a third fastening hole 859a communicating with the second fastening hole 849a.

Accordingly, one screw may pass through the third fastening hole 859a—the second fastening hole 849a—the first fastening hole 829a to be finally fixed to the housing fixing portion 22.

However, the third fastening portion 859 may be provided at the front and rear ends of the cover body 851 and may be provided only on the left or right side, and an insertion hook (not shown) inserted into a hook fastening hole 841a formed at the permanent magnet housing body 841 may be provided on a lower surface of the cover body 851.

Meanwhile, when the drum 3 rotates during washing, drying, or refreshing, vibration may be transmitted to the tub 2 and the structures mounted on the tub 2 also vibrate, so the parts mounted on the tub 2 may be damaged.

To solve this problem, a weight balancer 15 for damping vibration generated by the drum 3 may be provided on the outside of the gasket 4 and on the front surface of the tub 2, and the weight balancer 15 may include a first balancer 151 and a second balancer 152 respectively provided on both sides with respect to the center of a horizontal width direction of the tub 2.

Vibration of the drum transmitted to the tub and the cabinet may be damped by the aforementioned balancer structure, and thus a problem of the induction module being removed from the tub or the coil accommodated in the induction module being removed may be prevented.

Figure 4:
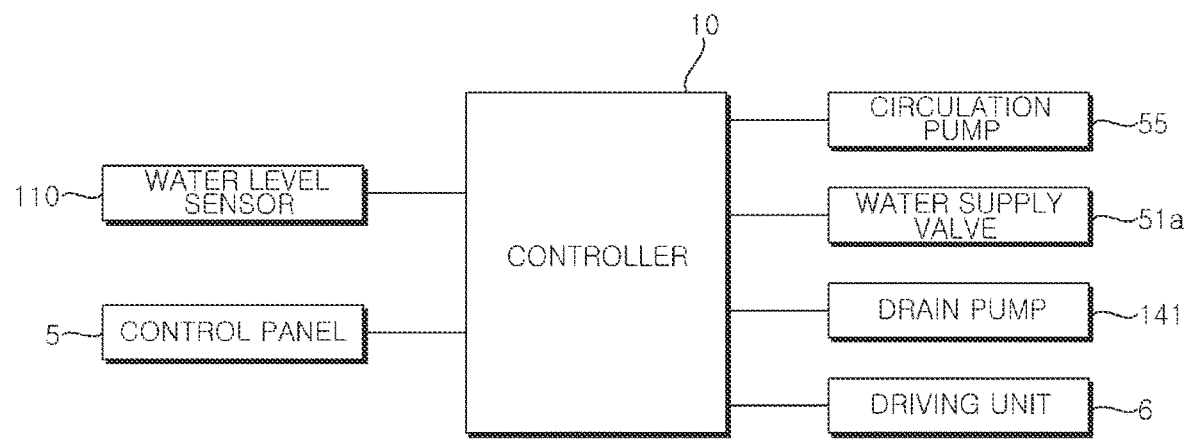
FIG. 4 is a block diagram illustrating a configuration for controlling a clothing treatment apparatus according to an embodiment of the present disclosure.

FIG. 4 is a block diagram illustrating a configuration for controlling a clothing treatment apparatus according to an embodiment of the present disclosure described above. Hereinafter, descriptions thereof will be given with reference to FIG. 4.

The controller 10 is provided on the control panel 5 and the like, and may be provided to perform various washing cycles or options described above upon receiving a user's instruction to operate the clothing treatment apparatus through the operating unit provided on the control panel 5.

That is, the controller 10 may be provided to control the water supply valve Sla, the drain pump 141, the circulation pump 55, and the driving unit 6 using water level information detected by the water level detecting unit 110, while performing the determined washing cycle and options. In addition, the control panel 5 may include a display unit and may provide the user with various courses and current states of the above-described clothing treatment apparatus.

According to the control configuration, when clothes are loaded into the drum 3 and an operation command of the clothing treatment apparatus is input to the operating unit, the controller 10 may supply water to the tub 20 and then drive the driving unit 6 to stir the drum 3 horizontally or rotate the drum 3 in one direction to perform a washing cycle, a rinsing cycle, and a spin-drying cycle.

Figure 5:
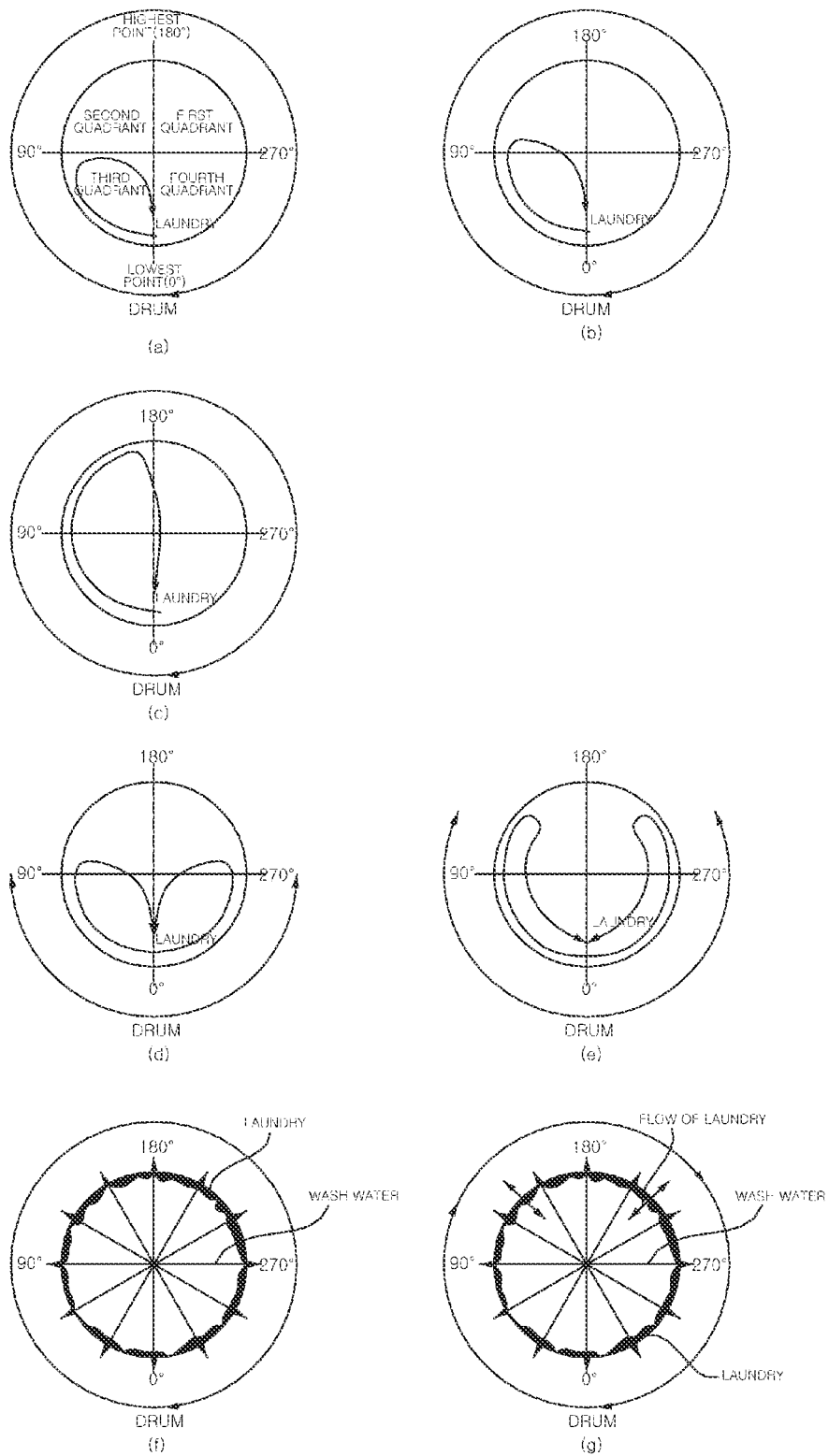
FIG. 5 is a view illustrating driving motions of a drum that may be implemented by a clothing treatment apparatus according to an embodiment of the present disclosure.
Figure 6:
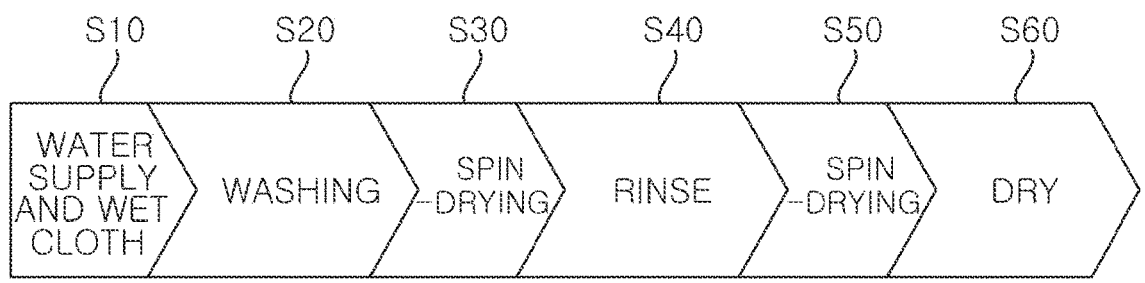
FIG. 6 is a view illustrating a washing cycle applied to a clothing treatment apparatus according to an embodiment of the present disclosure.

FIG. 5 is a view illustrating driving motions of a drum that may be implemented by a clothing treatment apparatus according to an embodiment of the present disclosure, and FIG. 6 is a view illustrating a washing cycle applied to a clothing treatment apparatus according to an embodiment of the present disclosure.

Hereinafter, descriptions are given with reference to FIGS. 5 and 6.

A driving motion of the drum refers to a combination of a rotation direction and a rotation speed of the drum 3, the laundry accommodated in the drum 3 varies in a falling direction or a falling point depending on the driving motion of the drum, and as a result, a flow of the laundry accommodated in the drum 3 is changed. The driving motion of the drum is implemented by controlling the driving unit 6 by the controller 10.

Since the laundry is lifted by the lifter 35 provided on the inner circumferential surface of the drum 3 when the drum 3 rotates, impact applied to the laundry may be varied by controlling the rotation speed and rotation direction of the drum 3.

That is, it is possible to vary mechanical force such as friction between laundry items, friction between the laundry and wash water, and an impact of falling of the laundry. In other words, the degree of tapping or rubbing the laundry for washing may be varied, and the degree of dispersing or turning over the laundry may be varied.

Meanwhile, in order to implement these various drum driving motions, the driving unit 6 may be a direct motor. That is, a stator of the motor may be fixed to the rear of the tub 2, and a driving shaft rotated together with the rotor of the motor may directly drive the drum 3. This is because, by controlling a rotation direction and torque of the motor, a driving motion of the drum may be immediately controlled by maximally preventing a time delay or backlash.

Meanwhile, in the form of transmitting a rotational force of the motor to the rotating shaft through a pulley, etc., a drum driving motion of a type that allows a time delay or backlash, for example, a tumbling driving or a spin driving is possible, but it is not suitable for implementing various other drum driving motions. Since the driving method of the washing motor and the drum 3 is obvious to those skilled in the art, a detailed description thereof will be omitted.

(a) of FIG. 5 is a view illustrating a rolling motion. In the rolling motion, the driving unit 6 rotates the drum 3 in one direction (preferably, one or more rotations), and the laundry on the inner circumferential surface of the drum 3 is controlled to fall toward a lowest point of the drum 3 from a position less than about 90 degrees in the rotation direction of the drum 3.

For example, when the driving unit 6 rotates the drum 3 at about 40 RPM, the laundry located at the lowest point of the drum 3 rises to a predetermined height along the rotation direction of the drum 3 and then flows toward the lowest point of the drum 3 as if it rolls from a position less than about 90 degrees in the rotation direction. Visually, when the drum 3 rotates clockwise, the laundry items continuously roll in the third quadrant of the drum 3.

During the rolling motion, the laundry is washed through friction with wash water, friction between the laundry, and friction with the inner circumferential surface of the drum 3. At this time, the laundry is turned over sufficiently to obtain the effect of gently rubbing to wash the laundry.

Here, a rotation speed (rpm) of the drum 3 is determined in relation to a radius of the drum 3. As the rotation speed of the drum 3 increases, a centrifugal force acting on the laundry in the drum 3 also increases. The flow of laundry in the drum 3 is changed due to a difference in magnitude between the centrifugal force and gravity.

Of course, a rotational force of the drum 3 and the frictional force between the drum 3 and the laundry has also to be considered. As such, when considering various forces acting on the laundry, the rotation speed of the drum 3 in the rolling motion is determined in a range where the sum of the centrifugal force and the frictional force is smaller than the gravity (1G).

(b) of FIG. 5 is a view illustrating a tumbling motion. In the tumbling motion, the driving unit 6 rotates the drum 3 in one direction (preferably, one or more rotations), but the laundry on the inner circumferential surface of the drum 3 is controlled to fall from a position of about 90 degrees to 110 degrees in the rotation direction of the drum 3 to the lowest point of the drum 3.

In general, the tumbling motion is a drum driving motion used for washing and rinsing because mechanical force is generated only by controlling the drum 3 to rotate in one direction at an appropriate rotation speed.

That is, the laundry loaded into the drum 3 is located at the lowest point of the drum 3 before the driving unit 6 is driven. When the driving unit 6 provides torque to the drum 3, the drum 3 rotates, and the laundry is lifted from the lowest point to a predetermined height in the drum 3 by the lifter 35 provided on the inner circumferential surface of the drum 3 or the frictional force with the drum 3. For example, when the driving unit 6 rotates the drum 3 at about 46 rpm, the laundry falls from the lowest point of the drum 3 toward the lowest point of the drum 3 at a position of about 90 to 110 degrees in the rotation direction.

The rotation speed of the drum 3 in the tumbling motion may be determined in a range in which centrifugal force is generated larger than in the case of rolling motion but is generated less than gravity.

Visually, in the tumbling motion, when the drum 3 rotates clockwise, the laundry rises from the lowest point of the drum 3 to a position of 90 degrees or to a second quadrant, and then is separated from the inner circumferential surface of the drum 3 to fall toward the lowest point of the drum 3.

Accordingly, during the tumbling motion, the laundry is washed by friction with wash water and an impact force induced by falling, in particular, by a greater mechanical force than in the case of the rolling motion.

(c) of FIG. 5 is a view illustrating a step motion. In the step motion, the driving unit 6 rotates the drum 3 in one direction (preferably, less than one rotation), but the laundry on the inner circumferential surface of the drum 3 is controlled to fall from a vicinity of the highest point of the drum 3 (preferably, a position of about 146 to 161 degrees in the rotation direction of the drum 3 but is not necessarily limited thereto and may be an angle position greater than 161 degrees within a range not exceeding 180 degrees) toward the lowest point of the drum 3.

That is, the step motion is a speed at which laundry does not fall from the inner circumferential surface of the drum 3 due to centrifugal force (that is, a speed at which laundry is rotated together with the drum 3 while being adhered to the inner circumferential surface of the drum 3 due to centrifugal force), and is a motion that maximizes the impact force on the laundry by rapidly braking the drum 3 after rotating the drum 3.

For example, when the driving unit 6 rotates the drum 3 at about 60 rpm or more, the laundry may rotate without falling by centrifugal force (that is, in a state of being adhered to the inner circumferential surface of the drum 3 and rotated together with the drum 3), and in this process, when the laundry is located near the highest point (180 degrees in the rotation direction) of the drum 3, a torque in a direction opposite to the rotation direction of the drum 3 may be controlled to be applied to the driving unit 6.

After the laundry rises from the lowest point of the drum 3 in the rotation direction of the drum, the drum 3 stops and the laundry falls to the lowest point of the drum 3, so that the laundry has a maximum drop, and thus the impact force acting on the laundry is also maximized. Mechanical force (e.g., impact force) generated by such a step motion is greater than the aforementioned rolling motion or tumbling motion.

Visually, in the step motion, when the drum 3 rotates clockwise, the laundry located at the lowest point of the drum 3 moves to the highest point (180 degrees) of the drum 3 through the third and second quadrants and is then suddenly separated from the inner circumferential surface of the drum 3 to fall toward the lowest point of the drum 3. Therefore, the step motion provides the greatest mechanical force as the laundry has the largest drop and the laundry amount is smaller.

Meanwhile, as a control method of the driving unit 6 for braking the drum 3, reverse-phase braking may be used. Reverse-phase braking is a method of braking by generating a rotational force in a direction opposite to the direction in which the driving unit 6 rotates. In order to induce a rotational force opposite to the direction in which the driving unit 6 rotates, a phase of power supplied to the driving unit 6 may be reversed, thereby enabling sudden braking in this way. Therefore, reverse-phase braking is suitable for step motion.

After the driving unit 6 is braked, the driving unit 6 applies torque to the drum 3 again to raise the laundry at the lowest point of the drum 3 to the highest point. That is, after applying a torque to rotate in a forward direction, a torque is applied to instantaneously rotate in a reverse direction to make a sudden stop, and thereafter, a torque is applied to rotate in the forward direction again to implement the step motion.

Therefore, in the step motion, when the drum 3 rotates, the wash water introduced through the through-hole 33 formed in the drum 3 rubs the laundry to wash the laundry, and when the laundry is located at the highest point of the drum 3, the laundry falls to be washed by impact force.

(d) of FIG. 5 is a view illustrating a swing motion. In the swing motion, the driving unit 6 rotates the drum 3 in both directions and the laundry falls from a position less than about 90 degrees in the rotation direction of the drum 3 (preferably, a position of about 30 to 45 degrees in the rotation direction of the drum 3 but is not necessarily limited thereto and may be an angular position greater than 45 degrees within a range not exceeding 90 degrees). For example, when the driving unit 6 rotates the drum 3 counterclockwise at about 40 rpm, the laundry located at the lowest point of the drum 3 rises to a predetermined height in the counterclockwise direction. At this time, the driving unit 6 stops the rotation of the drum 3 before the laundry reaches the position of about 90 degrees in the counterclockwise direction, so that the laundry moves toward the lowest point of the drum 3 from the position less than about 90 degrees in the counterclockwise direction.

After the drum 3 stops rotating in this way, the driving unit 6 rotates the drum 3 clockwise at about 40 RPM this time so that the laundry rises to a predetermined height in the rotation direction (i.e., clockwise) of the drum 3. Also, before the laundry reaches the position of about 90 degrees in the clockwise direction, the driving unit 6 controls the drum 3 so that the rotation of the drum 3 is stopped, so that the laundry falls toward the lowest point of the drum 3 from a position less than about 90 degrees in the clockwise direction.

That is, the swing motion is a motion in which forward rotation/stop of the drum 3 and reverse rotation/stop of the drum 3 are repeated. After the laundry located at the lowest point of the drum 3 rises to the second quadrant through the third quadrant, the laundry gently falls, and after the laundry rises to the first quadrant through the fourth quadrant, the laundry gently falls, and this operations are repeated. That is, visually, the swing motion is a form in which the laundry flows in the FIG. 8 shape lying on its side across the third and fourth quadrants of the drum 3.

In this case, power generation braking is suitable for braking of the driving unit 6. Power generation braking minimizes a load generated in the driving unit 6, minimizes mechanical wear of the driving unit 6, and at the same time, adjusts impact applied to the laundry.

The power generation braking is a braking method using that the driving unit 6 acts as a generator by rotational inertia when a current applied to the driving unit 6 is turned off. When the current applied to the driving unit 6 is turned off, a direction of the current flowing through the coil of the driving unit 6 is opposite to a direction of a current before the power is turned off, and thus, force (the Fleming's rule) acts in a direction in which the rotation of the driving unit 6 is interrupted, thereby breaking the driving unit 6. Unlike reverse-phase braking, power generation braking does not rapidly brake the driving unit 6 and allows the rotation direction of the drum 3 to be smoothly switched.

(e) of FIG. 5 is a view illustrating a scrub motion. The scrub motion is a motion in which the driving unit 6 rotates the drum 3 alternately in both directions and the laundry is controlled to fall at a position of about 90 degrees or greater in the rotation direction of the drum 3.

For example, when the driving unit 6 rotates the drum 3 in the forward direction at about 60 rpm or more, the laundry located at the lowest point of the drum 3 rises to a predetermined height in the forward direction. At this time, when the laundry reaches a position corresponding to a set angle equal to or greater than about 90 degrees (preferably, 139 to 150 degrees, but not necessarily limited thereto, and may also be 150 degrees or more), the driving unit 6 provides a reverse torque to the drum 3 to temporarily stop the rotation of the drum 3. Then, the laundry on the inner circumferential surface of the drum 3 falls rapidly.

Thereafter, the driving unit 6 rotates the drum 3 in the reverse direction at about 60 rpm or more to raise the dropped laundry to a predetermined height of 90 degrees or more in the reverse direction. When the laundry reaches a set angle of 90 degrees or more in the reverse direction (for example, a position corresponding to 139 to 150 degrees), the driving unit 6 provides a reverse torque to the drum 3 again to temporarily stop the rotation of the drum 3. At this time, the laundry on the inner circumferential surface of the drum 3 falls toward the lowest point of the drum 3 from a position of 90 degrees or more in the reverse direction.

The scrub motion washes the laundry by causing the laundry to fall rapidly from a predetermined height. At this time, it is preferable that the driving unit 6 is reverse-phased for braking the drum 3.

Since the rotation direction of the drum 3 is rapidly changed, the laundry does not deviate significantly from the inner circumferential surface of the drum 3, so that a very powerful rubbing effect may be obtained.

In the scrub motion, the laundry that has moved forward through the third quadrant to the second quadrant falls rapidly, and moves backward through the fourth quadrant to a portion of the first quadrant, and then falls repeatedly. Therefore, visually, it may be a form in which the laundry rises and then falls along the inner circumferential surface of the drum 3 repeatedly.

(f) of FIG. 5 is a diagram illustrating a filtration motion. The filtration motion is a motion in which the driving unit 6 rotates the drum 3 so that the laundry does not fall off the inner circumferential surface of the drum 3 by centrifugal force, and in this process, wash water is sprayed into the drum 3 through the nozzle.

After the laundry is unfolded, wash water is sprayed into the drum 3 while the laundry is in close contact with the inner circumferential surface of the drum 3, so that the sprayed wash water goes through the laundry by the centrifugal force and then exits to the tub 2 through the through-hole 33 of the drum 3.

By the filtration motion, a surface area of the laundry is increased, since wash water goes through the laundry, there is an effect that the laundry is evenly wetted.

(g) of FIG. 5 is a view illustrating a squeeze motion. In the squeeze motion, the driving unit 6 rotates the drum 3 so that the laundry does not fall off the inner circumferential surface of the drum 3 by centrifugal force, and then lowers a rotation speed of the drum 3 to separate the laundry from the inner circumferential surface of the drum 3, and this operation is repeatedly performed and wash water is sprayed into the drum through the nozzle during the rotation of the drum 3.

In the filtration motion, the drum 3 continues to rotate at a speed at which the laundry does not fall off the inner circumferential surface of the drum 3, but in the squeeze motion, the rotation speed of the drum 3 is changed to repeat the adhesion and separation of the laundry to and from the inner circumferential surface of the drum 3.

The step motion and the scrub motion have excellent washing power, so they are suitable for a case where the laundry is heavily polluted and for a washing course to shorten a washing time. Also, the step motion and the scrub motion are motions with high levels of vibration and noise. Therefore, the step motion and the scrub motion are not desirable when the laundry is sensitive clothing or for a washing course in which noise and vibration need to be minimized.

The rolling motion is a motion having excellent washing power, a low vibration level, minimal damage to laundry, and a low motor load. Therefore, the rolling motion may be applied to all washing courses, but in particular, it is suitable for dissolving detergent and wetting laundry at an initial stage of washing. However, compared to the tumbling motion, the rolling motion has a lower vibration level, but takes a longer time to wash in the case of performing washing to the same level as that of the tumbling motion.

In the tumbling motion, a cleaning force is lower than that of the scrub motion, but a vibration level is intermediate between the scrub motion and the rolling motion. The tumbling motion may be applied to all washing courses.

In the squeeze motion, washing force is similar to that of the tumbling motion, and a vibration level is higher than that of the tumbling motion. The squeeze motion is useful for a rinsing step because wash water goes through the laundry and is discharged to the outside of the drum 3 in the process of repeating the adhesion and separation of the laundry on the inner circumferential surface of the drum 3.

The swing motion is a motion with the lowest vibration level and cleaning power. Therefore, the swing motion is a motion useful for a low-noise or low-vibration washing course, and is a motion suitable for sensitive laundry (gentle care).

Meanwhile, referring to FIG. 6, the entire washing order applied to the clothing treatment apparatus according to an embodiment of the present disclosure will be described. The clothing treatment apparatus of the present embodiment may include a water supply/cloth wetting cycle (S10), a washing cycle (S20), a spin-drying cycle (S30), a rinsing cycle S40, a spin-drying cycle S50, and a drying cycle S60.

Prior to the washing cycle (S20), the cloth wetting (S10) may be performed. The cloth wetting (S10) is a process of wetting laundry prior to washing. Water is supplied to the tub 2, and the drum 3 is rotated to perform wetting (S10). In addition, the circulation units 55 and 57 may be driven.

The washing cycle (S20) is a cycle of removing contamination from the laundry by rotating the drum 3 according to a preset algorithm, and the rolling motion and tumbling motion described above may be performed.

The rinsing cycle (S40) is a cycle of removing detergent adhered to the laundry, in which water is supplied, the rolling motion and the tumbling motion may be performed, and then, the spin-drying cycle may be performed again. In addition, in the rinsing cycle of the present embodiment, the filtration motion described above may be performed to remove lint adhered to the inner circumferential surface of the gasket and the inner surface of the door, which will be described later.

Briefly, referring to the filtration motion performed to remove lint in the rinsing cycle of the present embodiment, a water level of water accommodated in the drum or the tub is varied to form a water current according to rotation of the drum through the filtration motion, and accordingly water may be supplied to the inner circumferential surface of the gasket or the inner surface of the door to remove lint. Details thereof will be described later.

The spin-drying cycles (S30 and S50) are cycles of removing water from the laundry, while rotating the drum 3 at high speeds. The dehydration operation (S50) may be performed after the rinsing operation (S40). In addition, the spin-drying cycle (S30) may be performed after the rinsing cycle (S40). In addition, the spin-drying cycle (s30) may also be performed between the washing cycle (S20) and the rinsing cycle (S40). The spin-drying cycle (S30) performed between the washing cycle (S20) and the rinsing cycle (S40) may be referred to as a simple spin-drying cycle (S30) to be distinguished from the spin-drying cycle (SS0) performed after the rinsing cycle (S40).

The drying cycle (S60) is a cycle of drying laundry by applying heat. In the clothing treatment apparatus according to an embodiment of the present disclosure, the induction module 8 may heat the drum 3 to heat and dry the laundry in contact with the drum 3. In the drying cycle (S60), the induction string module 8 may heat the drum 3, and the driving unit 6 may rotate the drum 3.

As drying proceeds, lint may be separated from the laundry. The separated lint may accumulate in the gasket 4 and the door 12.

Figure 7:
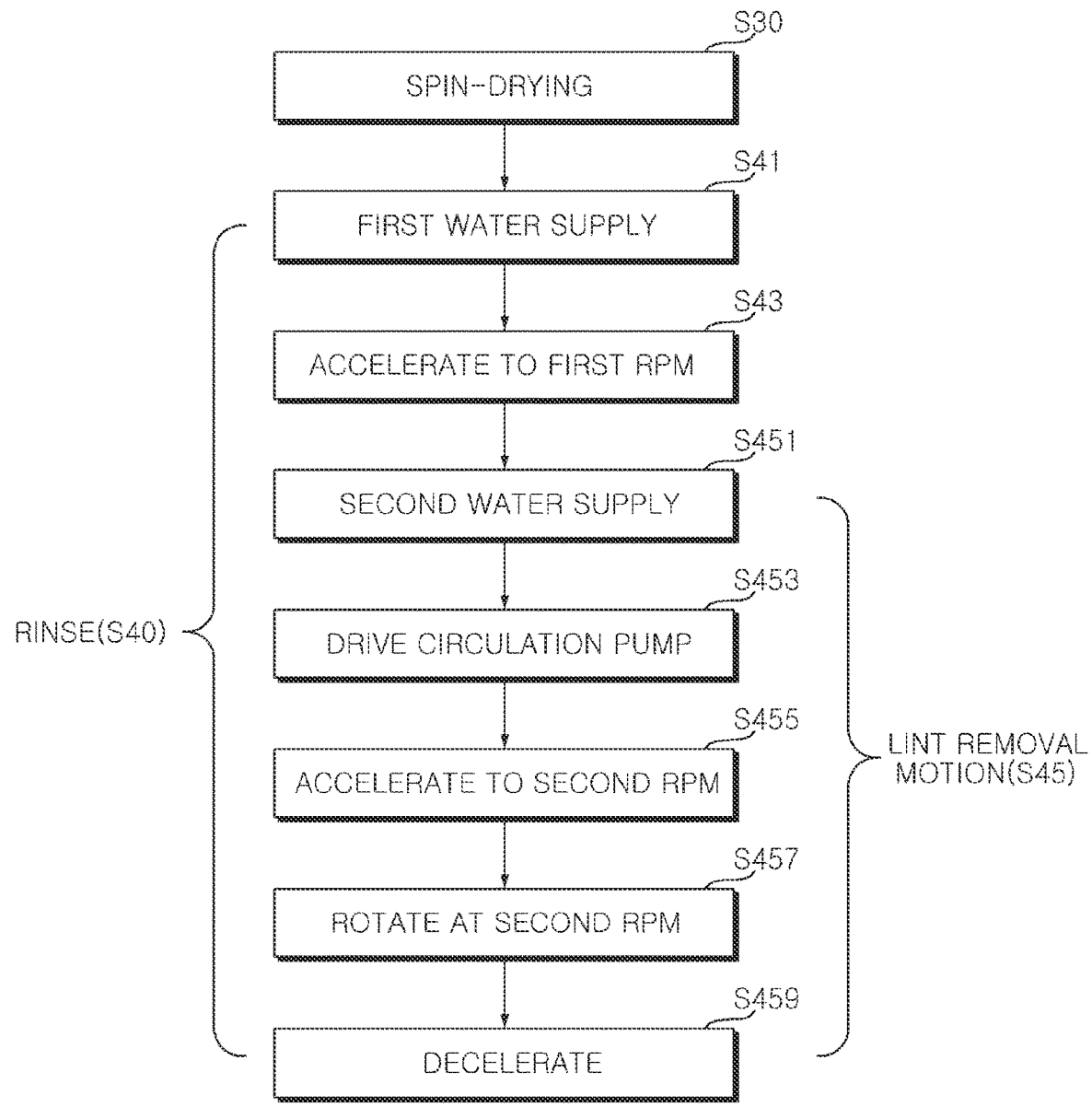
FIG. 7 is a view illustrating a portion of a washing cycle applied to a clothing treatment apparatus according to an embodiment of the present disclosure.

FIG. 7 is a view illustrating a portion of a washing cycle applied to a clothing treatment apparatus according to an embodiment of the present disclosure.

Referring to FIG. 7, the rinsing process (S40) of the clothing treatment apparatus according to an embodiment of the present disclosure will be described in more detail.

In the clothing treatment apparatus of the present embodiment, the rinsing cycle (S40) may be performed after the spin-drying cycle (S30). When the rinsing cycle (S40) is performed, the controller 10 performs a first water supply step (S41) of supplying water to a rinsing water level through the water supply flow path 51 to rinse the laundry accommodated in the drum 3.

The water level supplied in the first water supply step (S41) may be set to be different depending on the size of the clothing treatment apparatus and the amount of laundry that the clothing treatment apparatus may accommodate.

In general, the water level for rinsing laundry may be set to be higher than a height (minimum water level) from a lower end portion of the tub 2 to a lower end portion of the drum 3. That is, at least a portion of the drum 3 should be able to contact wash water to allow the wash water to flow by friction with the drum 3.

In addition, a maximum limit value of the water level for rinsing the laundry may not be set but may be set to be different according to the amount of laundry that the clothing treatment apparatus may accommodate as described above.

However, the controller 10 may control the water level for rinsing to be lower than or equal to a full water level. The full water level refers to a water level at which wash water fills the tub 2 and the drum 3 and overflows into the gasket 4 portion.

Therefore, the first water supply step (S41) refers to a water supply level for performing the rinsing cycle through the clothing treatment apparatus of the present embodiment. Also, the amount of wet cloth in the drum may be detected, while supplying water for rinsing. The rolling motion or the tumbling motion may be repeatedly performed when detecting the amount of wet cloth on the drum.

After water is supplied to the tub in the first water supply step (S41), a rotation step (S43) of rotating the drum 3 at a first RPM is performed. The first RPM is an RPM that may be set to be different according to the amount of wet cloth, etc. described above. In the rinsing step, detergent and foreign substances remaining in the laundry may be separated by horizontally stirring and rotating the drum or by intermittently rotating the drum in one direction. For example, the rolling motion, tumbling motion, scrub motion, etc. described above may be performed.

That is, the rotating step S43 is a step of rotating the drum for rinsing the laundry.

However, the first water supply step (S41) and the rotation step (S43) described above are not essential steps. Thus, the first water supply step (S41) and the rotation step (S43) may be omitted.

After the rotating step (S43), a second water supply step (S451) of supplying water to the tub 2 to a first water level higher than the water level in the first water supply step (S41) through the water supply unit is performed. When the rotation step (S43) is omitted, the step (S451) of supplying water to the tub 2 up to the first water level may be performed after the spin-drying cycle (S30).

The first water level supplied in the second water supply step (S451) may refer to a water level equal to or higher than the full water level described above. In more detail, the full water level refers to a water level at which wash water fills the tub 2 and the drum 3 and overflows into the gasket 4, so the first water level may be set to a water level lower than a lower end of the tub opening 21.

Accordingly, the first water level may be set to a water level higher than the lower end of the tub opening 21, and may be set to a water level at which up to a portion of a lower portion of the gasket 4 is submerged.

In the clothing treatment apparatus of the present embodiment, the induction module 8 is applied to perform washing and drying. Since the drum 3 is directly heated by the induction module 8 to transfer heat to the laundry and wash water accommodated in the drum, a circulation path provided in the clothing treatment apparatus of the related art is not provided. Therefore, by removing the circulation flow path, the space inside the cabinet 1 may be utilized. For example, compared with a clothing treatment apparatus having the cabinet 1 having the same size by increasing the capacity of the tub and drum, a larger amount of laundry and wash water may be accommodated.

However, since the flow (flow of air flowing from the front of the tub to the rear of the tub) generated by the circulation path flow of the related art is absent, a problem in that lint is accumulated on the inner surface of the door and the inner circumferential surface of the gasket may arise.

Therefore, in the clothing treatment apparatus of the present embodiment, when lint generated during the drying cycle is accumulated on the inner surface of the door or the inner circumferential surface of the gasket, lint accumulated on or adhered to the inner surface of the door and the inner circumferential surface of the gasket is to be removed by performing the lint removal motion S45, when performing the rinsing cycle by actuating the clothing treatment apparatus.

Therefore, the first water level supplied in the second water supply (S451) may be set to a higher water level than the water level supplied in the rinsing cycle of the related art. For example, the first water level may be set to a water level at which up to a lower portion of the inner circumferential surface of the gasket or a portion of a lower portion of the inner surface of the door may be submerged.

After water is supplied to the first water level in the second water supply step (S451), an acceleration step (S455) of accelerating the drum 3 to a second RPM may be performed. The acceleration step (S455) is a step of accelerating the drum 3 to the second RPM to form a water current of water supplied to the first water level, and the second RPM may be an RPM that may be set to be different from the first RPM depending on the amount of wet cloth, etc.

Preferably, the second RPM may be set to be equal to or greater than the first RPM. As the second water supply step (S451) is performed, the amount of wet cloth accommodated in the drum 3 may increase, and since the first water level is higher than the water level in the first water supply step, if the second RPM is set to be smaller than the first RPM, it may not be easy to form a water current to be generated through wash water supplied to the first water level.

In addition, the second RPM may be set to be the same as the drum RPM in the filtration motion described above. The drum RPM in the filtration motion may be set to an RPM at which the laundry is adhered to the inner circumferential surface of the drum and rotates, but in this step, the laundry may be adhered to the inner circumferential surface of the drum and rises at the second RPM and may fall to the lowest point of the drum according to the amount of wet cloth. When the laundry falls to the lowest point of the drum, supplied wash water may splash toward the front of the tub, so that lint accumulated on the inner surface of the door and the inner surface of the gasket may be removed.

Meanwhile, as described above, the rotating step S43 may be omitted. Hereinafter, the second RPM is also referred to as a first rotation speed.

Meanwhile, while the acceleration step S455 is performed, a circulating water supply step S453 of driving the circulation pump 55 to supply water discharged from the tub 2 to the inner circumferential surface of the gasket 4 may be performed.

The circulating water supply step (S453) may be performed simultaneously with the acceleration step (S455). Of course, the circulating water supply step (S453) may be performed before the acceleration step (S455). When the driving of the circulation pump 55 and the acceleration of the drum 3 at the first rotation speed are simultaneously performed, circulating water may be supplied to the inner circumferential surface of the gasket 4 while the drum 3 is being accelerated or after the drum 3 reaches the first rotation speed.

In the circulating water supply step (S453), the driving of the circulation pump 55 may be started simultaneously with the acceleration step (S455) in which the drum 3 accelerates to the first rotation speed, or the driving of the circulation pump 55 may be performed before the drum 3 starts to accelerate to the first rotation speed.

Visually, wash water supplied to the first water level, while the drum 3 accelerates to the first rotation speed, forms a water current according to the rotation of the drum 3, and as circulating water is supplied to the inner circumferential surface of the gasket 4, lint present on the inner surface of the door and the inner circumferential surface of the gasket 4 may be removed.

Also, as the rotation speed of the drum is accelerated in the acceleration step (S455), it goes through the rotation speed (hereinafter, referred to as a second rotation speed) in the tumbling motion described above, so that the laundry adhered to the inner circumferential surface of the drum may fall to the lowest point of the drum according to the rotation direction of the drum and wash water may splash to the front of the tub. As wash water splashes to the front of the tub, the effect of removing lint by supplying wash water to the inner surface of the door and the inner circumferential surface of the gasket may be expected.

Meanwhile, before the drum 3 is accelerated (S455) to the first rotation speed (second RPM) and rotated (S457), the drum 3 may be rotated at the second rotation speed. Thereby, lint on the inner surface of the door and the inner surface of the gasket may be removed. Alternatively, after rotating the drum 3 at the first rotation speed (S457), the drum 3 may be rotated at the second rotation speed.

After the acceleration step (S455), water supplied to the first water level by maintaining the rotation of the drum 3 at the first rotation speed (second RPM) may form a water current according to the rotation of the drum 3, so that a lint removal step (S457) of removing lint accumulated on the inner circumferential surface of the gasket 4 and the inner surface of the door 12 may be performed.

In the lint removal step (S457), the lint accumulated on the inner surface of the door and the inner circumferential surface of the gasket is removed by forming a water current through wash water supplied to the first water level, while maintaining the rotation of the drum 3 at the first rotation speed.

In more detail, as the drum 3 rotates at the first rotation speed, the water level of wash water supplied to the first water level is changed and wash water splashes onto the inner surface of the door and the inner circumferential surface of the gasket.

As described above, the first water level is the water level at which a portion of a lower portion of the inner surface of the door or a lower portion of the inner circumferential surface of the gasket is submerged, and thus, the portion of the lower portion of the inner surface of the door or the portion of the lower portion of the inner circumferential surface of the gasket may be washed by the formed water current, lint accumulated on the inner surface of the door or the inner circumferential surface of the gasket may be removed due to the phenomenon in which wash water splashes to the front of the tub.

Meanwhile, after the lint removal step (S457), a deceleration step (S459) of decelerating the rotation of the drum 3 may be performed. The deceleration step (S459) is a step of decelerating the rotation of the drum 3 by applying a torque to the motor in a direction opposite to the rotation direction of the drum 3 to apply braking.

Therefore, as the laundry adhered to the inner circumferential surface of the drum 3 falls to the lowest point of the drum 3, wash water splashes to the front of the tub, thereby removing lint accumulated on the inner surface of the door and the inner circumferential surface of the gasket.

That is, the motion of the drum in the deceleration step (S459) temporarily corresponds to the step motion described above.

Meanwhile, after braking the drum 3, while rotating the drum 3 at the first rotation speed, the step motion may be implemented. That is, after the drum 3 is rotated (S457) at the first rotation speed and then braked (S459), the drum 3 may be again rotated at the first rotation speed by a rotational angle within the range of 90 degrees to 180 degrees and braked, and this rotation and braking may be repeated alternately. Thereby, the lint accumulated in the gasket 4 and the door 12 may be removed.

Meanwhile, in order to effectively remove lint through each of the above steps, the circulating water supply step may be simultaneously performed while the acceleration step and the lint removal step are performed, and the water level of the tub preferably reaches the first water level at the start of the acceleration step. This will be described in more detail with reference to FIGS. 8 and 9.

Figure 8:
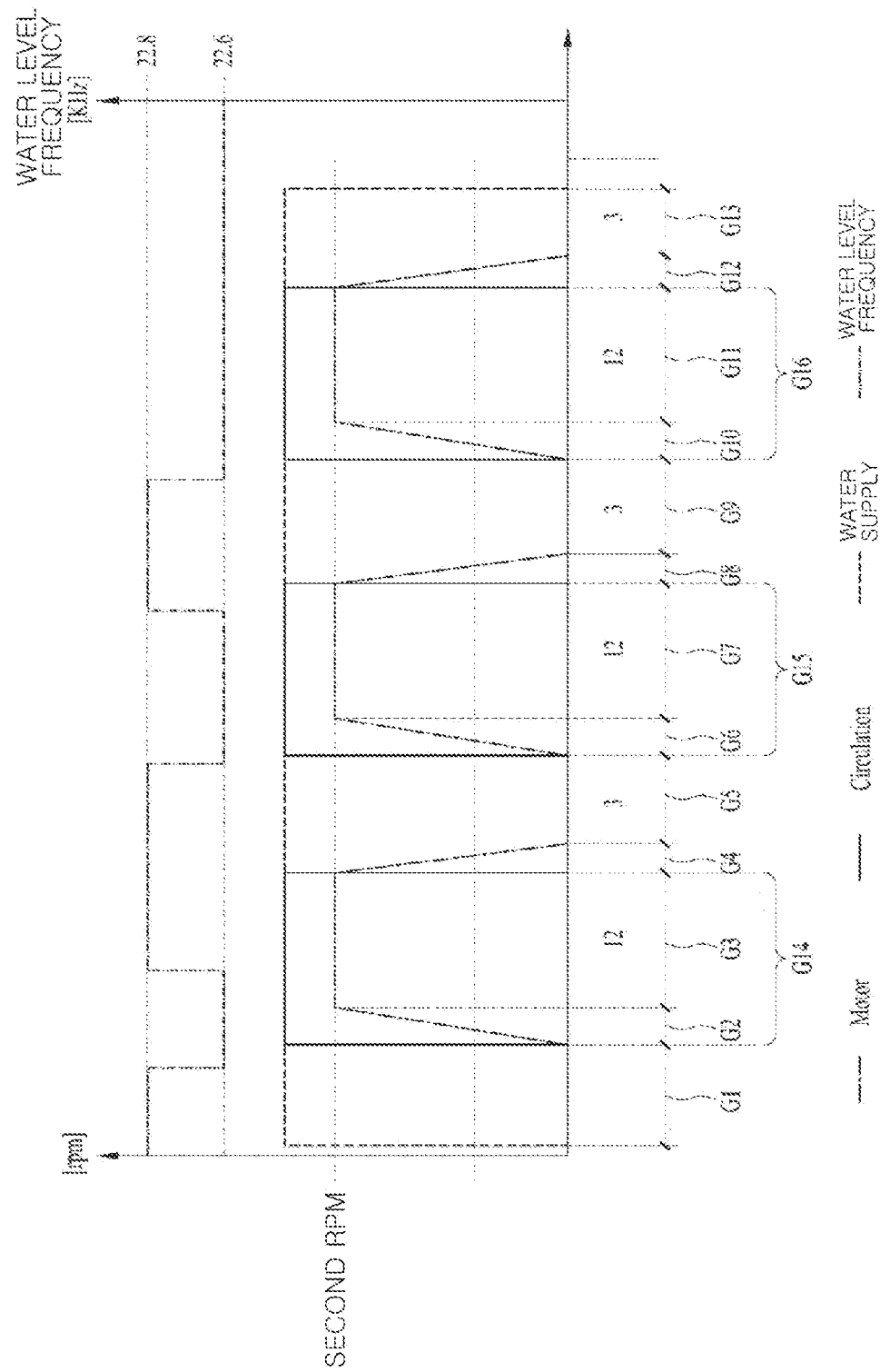
FIG. 8 is a view illustrating a relationship between a water level, a drum RPM, water supply, and circulation during a portion of a washing cycle of the drum according to an embodiment of the present disclosure.
Figure 9:
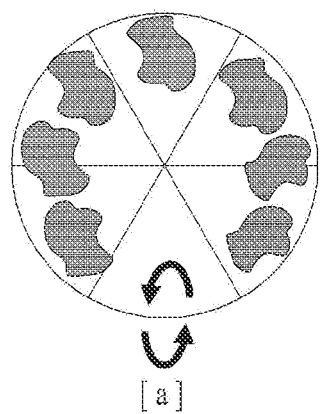
FIG. 9 is a view illustrating a cleaning portion of a gasket and a door during the cycle of FIG. 8.
Figure 9:
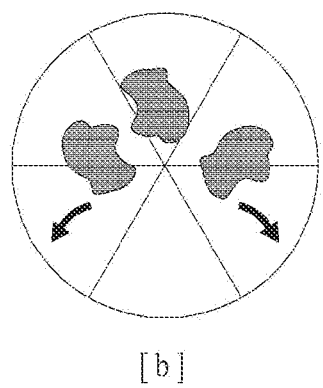
Figure 9:
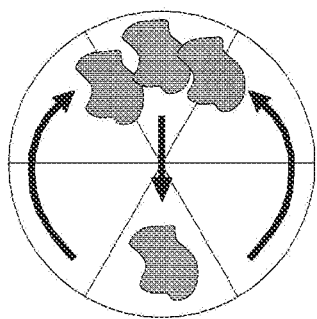
Figure 9:
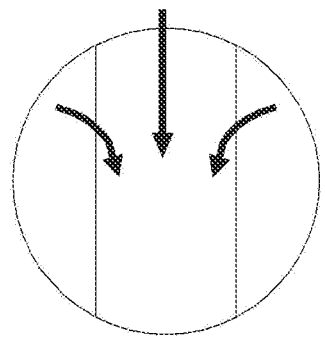

FIG. 8 is a view illustrating the relationship between a water level, drum RPM, water supply, and circulation during some of the washing cycles of the drum according to an embodiment of the present disclosure, and FIG. 9 is a view illustrating washing portion of the gasket and the door during the cycle of FIG. 8.

The left vertical axis of the graph shown in FIG. 8 represents an RPM of the drum, the right vertical axis of the graph represents a water level frequency, and the horizontal axis of the graph represents time.

A water level frequency may be measured by the water level detecting unit 113. The water level frequency is inversely proportional to a water level inside the tub 2. That is, when the water level frequency is low, the water level inside the tub is low, and when the water level frequency is high, the water level inside the tub 2 is high.

Hereinafter, it will be described with reference to FIGS. 8 and 9.

FIG. 8 is a view illustrating the relationship between the water level inside the tub, drum RPM, water supply, and circulation during the lint removal motion (S45).

A first section G1 is a section maintaining a state in which rotation of the drum 3 is stopped as the second water supply (S451) is performed after the rotating step (S43). Since water is supplied to the first water level through the water supply unit in the first section G1, the water level inside the tub is increased. For example, the water level frequency is lowered from 22.8 KHZ to 22.6 KHZ as the water supply progresses, and as described above, the lowering of the water level frequency means that the water level inside the tub increases.

A second section G2 corresponds to the acceleration step S455 described above. In the second section G2, the circulation pump 55 is operated to supply circulating water through the circulation flow path 57. A water level frequency at the start of the second section G2 is 22.6 KHZ, and wash water inside the tub 2 forms the first water level.

A third section G3 corresponds to the lint removal step S455 described above. In the third section G3, the drum 3 rotates at the first rotation speed (second RPM) to form a water current of wash water, and circulating water is supplied through the circulation flow path 57. It can be seen that the water level frequency increases as the third section G3 progresses. That is, the water level inside the tub 2 is lowered as the third section G3 proceeds. Due to the rotational motion of the drum 3, the laundry inside the drum may absorb more water.

A fourth section G4 corresponds to the deceleration step S459 described above. In the fourth section G4, the drum 3 is decelerated from the first rotation speed (second RPM). The drum 3 of this embodiment is braked in the deceleration step (S459) to stop the rotation, but the present disclosure is not necessarily limited thereto, and the drum 3 may be decelerated to a set rotation speed lower than the first rotation speed (second RPM).

When the drum decelerates from the first rotation speed, the laundry adhered to the inner circumferential surface of the drum falls, and as a result, water splashes toward the front of the tub, thereby removing lint accumulated on the inner surface of the door and the inner circumferential surface of the gasket. That is, since the lint removal effect may be expected as the drum 3 decelerates from the first rotation speed in the fourth section G4, the rotation of the drum 3 may be decelerated and stopped or decelerated at an RPM lower than that of the first rotation speed.

In a fourth section G4, the deceleration of the drum 3 is performed through reverse-phase braking. Accordingly, a magnitude of the acceleration at which the drum 3 is decelerated in the fourth section G4 may be greater than a magnitude of the acceleration at which the drum 3 is accelerated in the second section G2.

When the fourth section G4 starts, the operation of the circulation pump 55 may be stopped to stop the supply of circulating water. Also, since the water supply of wash water through the water supply unit is performed in the entire section in which the lint removal motion S45 is performed, the water level in the tub lowered in the third section G3 is increased to the first water level in the fifth section G5, so that a sixth section (G6, acceleration step) may be performed at the first water level.

Accordingly, the operation of the circulation pump 55 may be performed within a fourteenth section G14 including the second section G2 and the third section G3.

After the fifth section G5, a rotation speed variable section of the drum 3 and an operation section of the circulation pump 55 are repeated in the same manner up to the thirteenth section G13, and from the first section G1 to the 13$^{th}$ section G13, wash water is continuously supplied through the water supply unit.

As water is continuously supplied into the tub, a section maintained at the first water level is longer than that of the third section G3, while the drum rotates at the first rotation speed in the seventh section G7. Also, while the drum rotates at the first rotation speed in an eleventh section G11, a water level in the tub is maintained at the first water level, and the first water level may be maintained even at the point when the drum decelerates from the first rotation speed in the twelfth section G12.

That is, the first section G1 to the fourth section G4, the fifth section G5 to the eighth section G8, and the ninth section G9 to the thirteenth section G13 may form a first cycle, a second cycle, and a third cycle, respectively, and in each cycle, a change in the RPM of the drum and an operation time of the circulation pump are the same, but as each cycle progresses, the section maintained at the first water level becomes longer.

Therefore, since the water levels when the drum accelerates, rotates, and decelerates at each cycle are different, the amount and portion (upper side, center side, lower side) of the water current formed according to the motion of the drum are transferred to the front of the tub are different, so that lint accumulated in different portions may be removed. This will be described in more detail with reference to FIGS. 8 and 9 hereinafter.

(a), (b), and (c) of FIG. 9 are views schematically illustrating lint accumulated on the inner circumferential surface of the gasket and a flow of wash water transferred to the inner circumferential surface of the gasket, and (d) of FIG. 9 is a view schematically illustrating a flow of wash water flowing along the inner surface of the door.

It can be seen that, when the drum of the third section G3 rotates at the first rotation speed (second RPM), the water level in the tub maintains the first water level, and as the third section G3 proceeds, the water level in the tub decreases again. In this case, as the water level in the tub is lowered, a height at which water splashes when the drum rotates is also lowered. That is, referring to (a) of FIG. 9, a water current formed by the rotation of the drum may remove lint accumulated on the lower side of the gasket.

Also, in the second section G2, the sixth section G6, and the tenth section G10, when the drum is accelerated to the first rotation speed in a state in which the rotation of the drum is stopped, the water level in the tub is maintained at the first water level. As the drum accelerates, wash water rises along the inner circumferential surface of the drum, so that the water level of wash water supplied to the first water level is lowered at the center of the drum and the water level at both sides of the drum increases. Accordingly, referring to (b) of FIG. 9, lint accumulated on both lower sides of the gasket may be removed through the water level formed in the acceleration section of the drum.

Also, while the drum rotates at the first rotation speed in the eleventh section G11, the water level inside the tub maintains the first water level. Therefore, compared to the third section G3 and the seventh section G7 in which the water level is varied, a water current having a greater change in the level of the wash water supplied to the first water level may be formed. Therefore, referring to (c) and (d) of FIG. 9, a water current formed in the eleventh section G11 is transferred to both upper portions of the gasket and the door to remove accumulated lint.

Also, when the rotation of the drum decreases from the first rotation speed in the twelfth section G12, the water level inside the tub maintains the first water level. In this case, as the laundry adhered to the inner circumferential surface of the drum falls to the surface of the wash water and a height at which water splashes to the front of the tub may be the highest. Therefore, referring to (c) FIG. 9, lint present on the upper side of the inner circumferential surface of the gasket may be removed due to the water splashing phenomenon occurring while the laundry falls in the twelfth section G12.

Also, referring to (d) of FIG. 9, in the lint removal motion, lint adhered to the central portion of the inner surface of the door may be removed by supplying wash water through the water supply unit.

Certain embodiments or other embodiments of the disclosure described above are not mutually exclusive or distinct from each other. Any or all elements of the embodiments of the disclosure described above may be combined with another or combined with each other in configuration or function.

For example, a configuration "A" described in one embodiment of the disclosure and the drawings and a configuration "B" described in another embodiment of the disclosure and the drawings may be combined with each other. Namely, although the combination between the configurations is not directly described, the combination is possible except in the case where it is described that the combination is impossible.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:

1. A clothing treatment apparatus comprising:
a cabinet having an inlet port on a front side;
a door coupled to the cabinet to open and close the inlet port;
a tub disposed inside the cabinet, having an opening communicating with the inlet port of the cabinet, and providing a space for accommodating water;
a drum rotatably provided in the tub and providing a space for accommodating laundry;
a driving unit rotating the drum;
a gasket connecting the inlet port of the cabinet to the opening of the tub, the gasket having an inner surface providing a laundry access passage; and
a water supply unit supplying water to the tub,
wherein the water supply unit is configured to supply water to the tub up to a first water level higher than a lowermost portion of the inner surface of the gasket,
wherein the driving unit is configured to, in a state in which a water level of the tub is the first water level, rotate the drum at a first rotational speed at which a centrifugal force acting on the laundry in the drum by the rotation of the drum is greater than the gravity acting on the laundry, the driving unit being configured to, based on rotating the drum at the first rotational speed, cause the water in the tub to rise along an inner surface of the tub and flow below the gasket.

2. The clothing treatment apparatus of claim 1, wherein the driving unit accelerates the drum to the first rotational speed in a state in which the water level of the tub is the first water level.

3. The clothing treatment apparatus of claim 2, wherein the driving unit accelerates the drum to the first rotation speed after passing a second rotation speed slower than the first rotation speed in a section in which the drum is accelerated to the first rotation speed, and
the second rotation speed is a rotation speed at which the laundry in the drum rises above a height corresponding to a rotation center of the drum by the rotation of the drum and then falls apart from the drum.

4. The clothing treatment apparatus of claim 3, wherein the driving unit rotates the drum, while maintaining the second rotation speed, in a state in which the water level of the tub is the first water level.

5. The clothing treatment apparatus of claim 1, further comprising:
a water level detecting unit detecting a water level of the tub,
wherein the driving unit stops the drum after rotating the drum at the first rotation speed,
the water level detecting unit detects the water level of the tub in a state in which the drum is stopped, and
the water supply unit re-supplies water to the tub up to the first water level when the water level of the tub is lower than the first water level after the drum rotates at the first rotation speed.

6. The clothing treatment apparatus of claim 5, wherein the driving unit rotates the drum again at the first rotation speed after the water supply unit re-supplies water to the tub.

7. The clothing treatment apparatus of claim 1, wherein the driving unit brakes the drum after rotating the drum at the first rotation speed, and a phase of power applied to the driving unit in a section in which the drum is braked is reversed from a phase of power applied to the driving unit in a section in which the drum rotates at the first rotation speed.

8. The clothing treatment apparatus of claim 7, wherein the driving unit, in a state in which the water level in the tub is the first water level, rotates the drum by a rotation angle within a range of 90 degrees to 180 degrees at the first rotation speed and then brakes the drum, and rotation and braking of the drum are repeated alternately.

9. The clothing treatment apparatus of claim 1, further comprising:
a circulation pump pumping water discharged from the tub;
a nozzle provided in the gasket and having an outlet located in the laundry access passage; and
a circulation flow path connecting the circulation pump to the nozzle,
wherein the circulation pump is driven when the driving unit rotates the drum.

10. The clothing treatment apparatus of claim 1, further comprising:
an induction heater disposed on an outer surface of the tub and heating the drum,
wherein the induction heater heats the drum in a state in which water in the tub is drained, and when the induction heater heats the drum, the driving unit rotates the drum.

11. The clothing treatment apparatus of claim 1, further comprising a controller configured to control the driving unit, wherein the controller is configured to control the driving unit to rotate the drum at the first rotational speed in the state in which the water level of the tub is the first water level.

12. The clothing treatment apparatus of claim 11, wherein the controller is further configured to, before rotating the drum at the first rotational speed, control the water supply unit to supply the water to the first water level in the tub.

* * * * *